United States Patent
Holman et al.

(10) Patent No.: US 11,738,301 B2
(45) Date of Patent: Aug. 29, 2023

(54) CONTINUOUS PROCESSES AND SYSTEMS TO REDUCE ENERGY REQUIREMENTS OF USING ZEOLITES FOR CARBON CAPTURE UNDER HUMID CONDITIONS

(71) Applicant: CARBON CAPTURE, INC., Los Angeles, CA (US)

(72) Inventors: Brian J. Holman, Los Angeles, CA (US); William T. Gross, Pasadena, CA (US); Andrea Pedretti, Pasadena, CA (US); Saeb Besarati, Los Angeles, CA (US); Alex Welch, Los Angeles, CA (US); Dan Fang, Los Angeles, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 17/823,016

(22) Filed: Aug. 29, 2022

(65) Prior Publication Data
US 2023/0073553 A1    Mar. 9, 2023

Related U.S. Application Data

(60) Provisional application No. 63/238,189, filed on Aug. 29, 2021.

(51) Int. Cl.
*B01D 53/02* (2006.01)
*B01D 53/08* (2006.01)

(52) U.S. Cl.
CPC .......... *B01D 53/08* (2013.01); *B01D 2221/16* (2013.01); *B01D 2257/504* (2013.01); *B01D 2257/80* (2013.01); *B01D 2259/40088* (2013.01)

(58) Field of Classification Search
CPC ................ B01D 53/08; B01D 2221/16; B01D 2257/504; B01D 2257/80; B01D 2259/40088
See application file for complete search history.

(56) References Cited

U.S. PATENT DOCUMENTS

| 4,180,985 A | 1/1980 | Northrup, Jr. |
| 5,660,048 A * | 8/1997 | Belding ................ F24F 5/0035 |
|  |  | 62/271 |

(Continued)

FOREIGN PATENT DOCUMENTS

WO    2019/161114 A1    8/2019

OTHER PUBLICATIONS

International Search Report and Written Opinion for PCT International Application No. PCT/US2022/075599, dated Nov. 21, 2022.

*Primary Examiner* — Christopher P Jones
(74) *Attorney, Agent, or Firm* — RAPHAEL BELLUM PLLC

(57) ABSTRACT

The direct air capture (DAC) systems and methods efficiently and economically regenerate a desiccant bed without adding any thermal energy and without requiring any pressurization or depressurization of the desiccant reactors. The methods leverage water concentration differences in stream flows, the water concentration profile across a desiccant bed, and, optionally, exothermic water adsorption. These three elements, working in combination, are referred to as "reverse dry flow regeneration" or a "reverse dry air swing" regeneration process. Systems and methods for reverse flow regeneration include those for $CO_2$ DAC applications, but they are also applicable to point source carbon capture and other similar technologies that require initial gas dehydration before exposure to a hydrophilic material.

19 Claims, 21 Drawing Sheets

(56) References Cited

U.S. PATENT DOCUMENTS

| | | |
|---|---|---|
| 2012/0219484 A1 | 8/2012 | Clark |
| 2017/0115016 A1* | 4/2017 | Goldsworthy ........ F24F 3/1423 |
| 2020/0001225 A1* | 1/2020 | Ritter ..................... C12M 47/18 |
| 2020/0009494 A1 | 1/2020 | Ritter |
| 2021/0055010 A1* | 2/2021 | McGrail ................. F24F 3/153 |
| 2021/0146299 A1 | 5/2021 | Besarati |

* cited by examiner

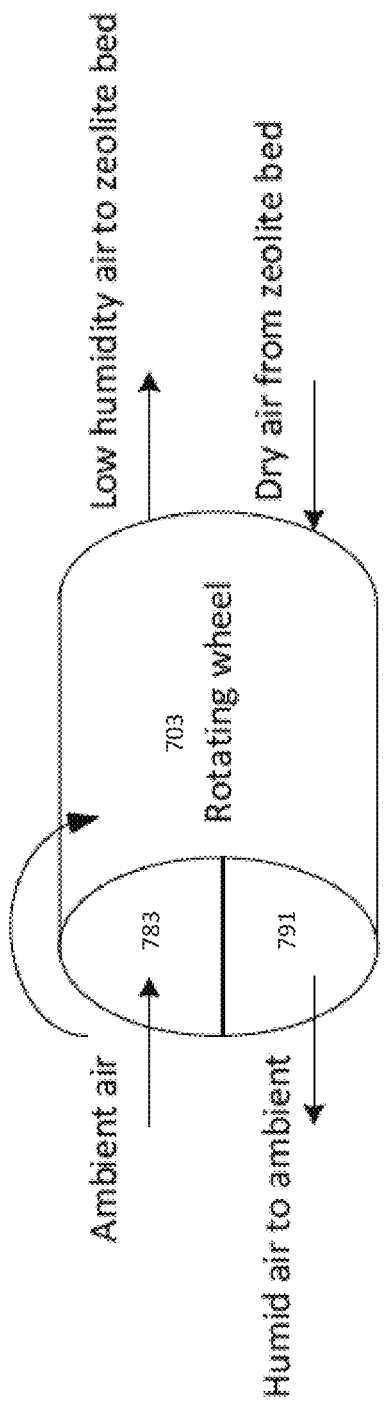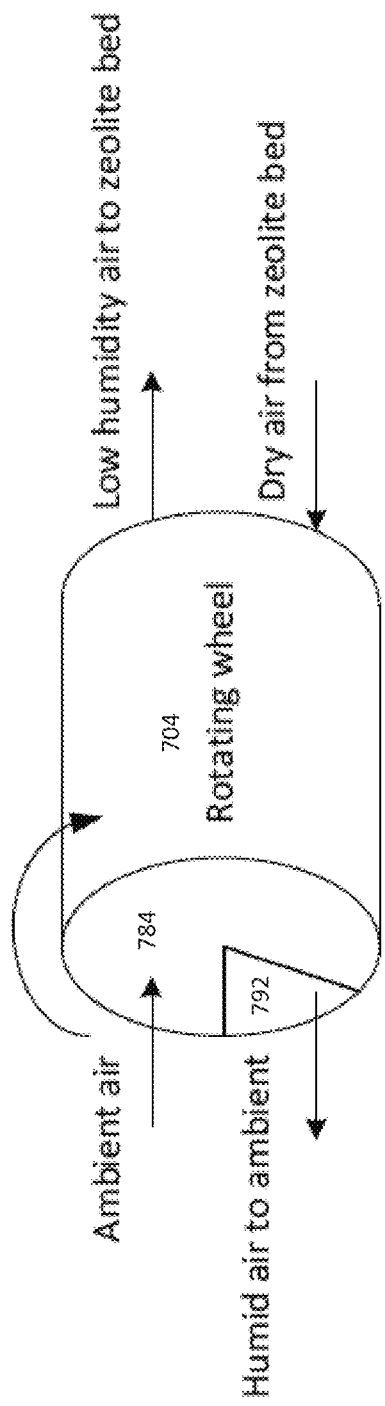
FIG. 7A
FIG. 7B

CONTINUOUS PROCESSES AND SYSTEMS TO REDUCE ENERGY REQUIREMENTS OF USING ZEOLITES FOR CARBON CAPTURE UNDER HUMID CONDITIONS

CROSS-REFERENCE TO RELATED APPLICATION

This application claims benefit of priority from U.S. Provisional Application No. 63/238,189 filed on Aug. 29, 2021, the entire contents of which are incorporated by reference.

TECHNICAL FIELD

The technology relates to the field of gas separation. In particular, the technology relates to modular structures and methods for gas separation processes for separating $CO_2$ from atmospheric air using direct air capture. The invention reduces the energy requirements required for using zeolites for carbon capture under humid conditions.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas and, due to widespread use of fossil fuels, its concentration in the atmosphere has sharply increased from 280 ppm in the pre-industrial era to 413 ppm in 2020, with about 2 ppm per year increase predicted thereafter. Climate change resulting from this increase poses a major threat to global health, security, and prosperity. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

Direct air capture—the large-scale use of machines and systems to filter out carbon dioxide from the air for permanent sequestration or use as a chemical feedstock—is one potential method to mitigate the impacts of $CO_2$ on climate change. One method for capturing $CO_2$ from air is using a solid sorbent in a batch temperature-vacuum swing adsorption (TVSA) process. In this process, air is passed through a sorbent at ambient temperature and pressure until the sorbent is sufficiently loaded with $CO_2$. Next, the reactor containing the sorbent is sealed and evacuated while the temperature of the sorbent is raised. The combination of heat and lower partial pressure of the adsorbate causes the adsorbed $CO_2$ to desorb, where it can be collected for storage.

A common approach to DAC basically involves a first step of moving ambient air through a bed of a solid sorbent that is effective at selectively capturing a significant portion or all of the $CO_2$ contained therein. Once the sorbent reaches a level of significant saturation of $CO_2$, it needs to be regenerated in a second step. During regeneration, the sorbent bed is treated with, for example, heat, vacuum, steam, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process. Moreover, additional energy is required to regenerate the sorbent, so the system needs to be highly efficient.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins. In some cases, the solid $CO_2$ sorbents are utilized in powder or pellet form in fluidized bed or packed bed configurations. In the case of packed beds, ambient air flows through a column of the packed sorbent and experiences a significant pressure drop across the column, requiring additional energy to compensate. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed.

Zeolites are porous aluminosilicates with well-defined crystalline structures. They have a proven track record of use in industry for catalysis, adsorption, and separation. The unique range of zeolite pore sizes, as well as their uniformity, enable them to separate molecules—such as carbon dioxide, water, sulfur dioxide, and hydrocarbons—based on their size. Zeolites work well for $CO_2$ direct air capture (DAC) and point source capture applications because of their potential for high selectivity, fast kinetics, low energy $CO_2$ capture cycles, long term stability, and low cost. Low-silica zeolites with the FAU framework topology are commercially available at a relatively low cost (13X and Y as trade names) and are amongst the most commonly used adsorbents in industrial gas adsorption and separation processes.

Zeolites strongly adsorb water along with $CO_2$ from air streams. This co-adsorbed moisture competes for adsorption sites with $CO_2$ and significantly reduces working capacities for $CO_2$ adsorption. Furthermore, the co-adsorbed moisture takes a significant amount of energy to desorb (4,200 kJ/kg H2O), which can greatly hinder the efficiency of an adsorption process. A major issue with zeolites is their hydrophilicity, which lowers $CO_2$ adsorption capacities and raises system energy requirements (for water removal). Hydrophilicity has widely been viewed as the main impediment to commercial implementation of zeolites in $CO_2$ DAC and point source $CO_2$ capture applications.

SUMMARY

One method to address zeolite's hydrophilicity issue is to place a desiccant bed in front of a zeolite bed in order to pre-dry the incoming stream. Such a bed is typically used to adsorb moisture from the air in a cyclical process such as a temperature swing, pressure swing, or temperature-vacuum swing (TVSA) method. Although the heat of adsorption for typical desiccants such as silica gel is less than that of zeolites (2,500 kJ/kg-$H_2O$ versus 4,200 kJ/kg-$H_2O$), the thermal energy required to regenerate the bed will still be exceedingly high—leading to prohibitive operational costs.

Furthermore, in such systems, it can be very difficult to completely dry the incoming air stream with reasonable energy input. Even small amounts of water vapor entering the zeolite reactors will gradually accumulate, poisoning the material capacity for $CO_2$ capture until such moisture is removed.

In contrast, the systems and methods in accordance with the invention efficiently and economically regenerate a desiccant bed without adding any thermal energy or requiring any pressurization or depressurization of the desiccant reactors. The methods work by leveraging 1) water concentration differences in stream flows; 2) water concentration profile across a desiccant bed; and (optionally) 3) exothermic water adsorption. These three elements, working in combination, are referred to as "reverse dry flow regeneration" or "reverse dry air swing" regeneration process in this disclosure. Although example embodiments of the invention described in this disclosure detail systems and methods for reverse flow regeneration for $CO_2$ DAC applications, they are also applicable to point source carbon capture and other similar technologies that require initial gas dehydration before exposure to a hydrophilic material.

The systems and methods in accordance with the invention provide efficient capture of $CO_2$ from ambient air. The systems use zeolites in a TVSA process to perform the $CO_2$ separation from air. This is combined with a reverse dry air swing process for pre-drying the air stream and regenerating the desiccant. Systems in accordance with the invention utilize two desiccant wheels placed on either end of a set of four or more zeolite reactors. Two continuous adsorption streams enter the unit from opposite directions. These streams each pass through a section of a desiccant wheel, where 80-95% of the moisture is removed; through a zeolite reactor, which removes $CO_2$ along with the remaining moisture in an adsorption/desorption process; and through a second desiccant wheel, where the very dry air stream regenerates the desiccant. The desiccant wheels rotate between these streams, such that a portion of each desiccant wheel is continuously adsorbing moisture from the incoming stream while the other portion is being regenerated by reverse dry flow of the outgoing air stream. In some example embodiments of the invention, zeolites are used as a sorbent for $CO_2$ capture. In other example embodiments, other sorbent materials can be used, including other molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins. By continuously removing a majority of the moisture with no heat input or pressurization/depressurization required in the desiccant reactors, the systems and methods in accordance with the invention provide a much simpler and more efficient capture system.

The systems and methods of the invention include a direct air capture (DAC) method for separating carbon dioxide ($CO_2$) from ambient air while regenerating a desiccant reactor. In one example embodiment of the invention, the method includes adsorption and desorption of carbon dioxide ($CO_2$) and water. The adsorption includes drawing a first ambient air stream into a direct air capture plant along a first flow path and receiving the first drawn-in ambient air stream in a portion of a first desiccant reactor. In some example embodiments of the invention, the method includes removing humidity from the first drawn-in ambient air stream with the first desiccant reactor to create a first relatively dry inlet gas stream. The first relatively dry inlet gas stream is received in a first solid sorbent bed and the remaining humidity and carbon dioxide ($CO_2$) is adsorbed with the first solid sorbent bed to create a first dry outlet gas stream. The method also includes passing the first dry outlet gas stream through a second desiccant reactor and removing water from the second desiccant reactor as the first dry outlet gas stream reacts with a desiccant in the second desiccant reactor. The removed water is re-adsorbed into ambient air.

In some example embodiments of the invention, the desorption parts of the methods include applying a vacuum to a third solid sorbent bed and a fourth solid sorbent bed to remove air from the third solid sorbent bed and from the fourth solid sorbent bed and to remove nitrogen from a solid sorbent in the third solid sorbent bed and in the fourth solid sorbent bed. The desorption part of the methods can also include heating the solid sorbent in the third solid sorbent bed and in the fourth solid sorbent bed to desorb carbon dioxide ($CO_2$) and water. Depending on the typical ambient conditions, in particular humidity, at a particular location, the particular desiccants and solid sorbents used, and the relative sizes of the desiccant reactors and the zeolite reactors, the relative adsorption and desorption times for the zeolite reactors may be similar or significantly different. For each solid sorbent bed undergoing adsorption, there can be additional solid sorbent beds simultaneously undergoing desorption and vice versa. The number of solid sorbent beds undergoing desorption depends on the different times for the beds to undergo adsorption and desorption. For example, if desorption takes twice as long for a particular sorbent bed, an additional sorbent bed can be utilized such that two beds may undergo desorption at the same time such that the effective desorption time is cut in half.

In some example embodiments of the invention, the methods for separating carbon dioxide ($CO_2$) from ambient air while regenerating a desiccant reactor can be a continuous process by drawing a second ambient air stream into the direct air capture plant along a second flow path, where the second flow path is in a direction opposite to the first flow path. The second drawn-in ambient air stream is received in a portion of the second desiccant reactor to create a second relatively dry inlet gas stream, and the second relatively dry inlet gas stream is received in a second solid sorbent bed. The second solid sorbent bed adsorbs remaining humidity and carbon dioxide ($CO_2$) to create a second dry outlet gas stream.

The first desiccant reactor is then regenerated by receiving the second dry outlet gas stream in a portion of the first desiccant reactor and removing water from the first desiccant reactor as the second dry outlet gas stream reacts with a desiccant in the first desiccant reactor. The removed water is then re-adsorbed into ambient air.

In some example embodiments of the invention at least one of the solid sorbent beds is a zeolite bed. Additionally, in some embodiments, the methods can also include filtering the first ambient air stream and/or the second ambient air stream.

In some embodiments, the methods can include separating the first ambient air stream from the second ambient air stream with an air sealing separator (181) positioned between the first flow path and the second flow path. Similarly, in some embodiments of the invention, the methods can also include separating the second dry outlet gas stream from the first dry outlet gas stream with an air sealing separator positioned between the first flow path and the second flow path.

In some example embodiments of the invention, the methods can include ejecting the re-adsorbed water from the second desiccant reactor and/or the re-adsorbed water from the first desiccant reactor into ambient air.

In some example embodiments, the methods can include transferring thermal energy generated from the adsorption of water in the first desiccant reactor to the dry stream exiting the first solid sorbent bed.

In some examples, the first desiccant reactor and/or the second desiccant reactor are desiccant wheels. Further, in some embodiments, the desiccant wheels rotate between the first ambient air stream and the second ambient air stream, such that a portion of each desiccant wheel is continuously adsorbing moisture from the respective incoming ambient stream while the remaining portion of each desiccant wheel is being regenerated by reverse dry flow of the outlet air stream.

The systems and methods of the invention include a direct air capture (DAC) method for separating carbon dioxide ($CO_2$) from ambient air while regenerating a desiccant reactor. In one example embodiment of the invention, the method includes separating carbon dioxide ($CO_2$) from ambient air by drawing a first ambient air stream into a direct air capture plant along a first flow path and receiving the first drawn-in humid inlet gas stream in a portion of a first desiccant reactor to create a first relatively dry inlet gas stream. The first relatively dry inlet gas stream is received in a solid sorbent bed and the remaining humidity and carbon dioxide ($CO_2$) is adsorbed in the solid sorbent bed to create a first dry outlet gas stream.

In some example embodiments of the invention, a second desiccant reactor is regenerated by receiving the first dry outlet gas stream in a portion of the second desiccant reactor and removing water from the second desiccant reactor as the first dry outlet gas stream reacts with a desiccant in the second desiccant reactor. The removed water is re-adsorbed into ambient air.

In some example embodiments of the invention, the methods for separating carbon dioxide ($CO_2$) from ambient air while regenerating a desiccant reactor can be a continuous process by drawing a second ambient air stream into the direct air capture plant along a second flow path, where the second flow path is in a direction opposite to the first flow path. In some embodiments, the methods include receiving the second drawn-in ambient air stream in a portion of the second desiccant reactor to create a second relatively dry inlet gas stream and receiving the second relatively dry inlet gas stream in a second solid sorbent bed. The second solid sorbent bed (889) adsorbs remaining humidity and carbon dioxide ($CO_2$) to create a second dry outlet gas stream.

The continuous process in some embodiments includes regenerating the first desiccant reactor (883) by receiving the second dry outlet gas stream in a portion of the first desiccant reactor and removing water from the first desiccant reactor as the second dry outlet gas stream reacts with a desiccant in the first desiccant reactor. The removed water is re-adsorbed into ambient air.

In some example embodiments of the invention at least one of the solid sorbent beds is a zeolite bed. Additionally, in some embodiments, the methods can also include filtering the first ambient air stream and/or the second ambient air stream.

In some embodiments, the methods can include separating the first ambient air stream from the second ambient air stream with an air sealing separator positioned between the first flow path and the second flow path. Similarly, in some embodiments of the invention, the methods can also include separating the second dry outlet gas stream from the first dry outlet gas stream with an air sealing separator positioned between the first flow path and the second flow path.

In some example embodiments of the invention, the methods can include ejecting the re-adsorbed water from the second desiccant reactor and/or the re-adsorbed water from the first desiccant reactor into ambient air.

In some example embodiments, the methods can include transferring thermal energy generated from the adsorption of water in the first desiccant reactor to the dry stream exiting the first solid sorbent bed.

In some examples, the first desiccant reactor and/or the second desiccant reactor are desiccant wheels. Further, in some embodiments, the desiccant wheels rotate between the first ambient air stream and the second ambient air stream, such that a portion of each desiccant wheel is continuously adsorbing moisture from the respective incoming ambient stream while the remaining portion of each desiccant wheel is being regenerated by reverse dry flow of the outlet air stream.

The systems and methods of the invention include a direct air capture (DAC) system for separating carbon dioxide ($CO_2$) from ambient air while regenerating a desiccant reactor. In one example embodiment of the invention, the system includes components and processes for adsorption and desorption of carbon dioxide ($CO_2$) and water. The system draws in a first ambient air stream along a first flow path, and a first desiccant reactor receives the first drawn-in ambient air stream in a portion of the first desiccant reactor. In some example embodiments of the invention, the system removes humidity from the first drawn-in ambient air stream with the first desiccant reactor to create a first relatively dry inlet gas stream. A first sorbent bed receives the first relatively dry inlet gas stream and adsorbs the (remaining) humidity and carbon dioxide ($CO_2$) to create a first dry outlet gas stream. The system passes the first dry outlet gas stream through a second desiccant reactor, which removes water as the first dry outlet gas stream reacts with a desiccant in the second desiccant reactor. The removed water is re-adsorbed into ambient air.

In some example embodiments of the invention, the desorption parts of the systems include a vacuum pump that applies a vacuum to a third solid sorbent bed and a fourth solid sorbent bed to remove air and nitrogen from a solid sorbent in the beds. The desorption components of the system can also include a heater and/or a heat exchanger that heats the solid sorbent in the third and fourth solid sorbent beds to desorb carbon dioxide ($CO_2$) and water. For each solid sorbent bed undergoing adsorption, there can be additional solid sorbent beds simultaneously undergoing desorption. The number of solid sorbent beds undergoing desorption depends on the different times for which it takes the beds to undergo adsorption and desorption. For example, if adsorption takes longer for a particular sorbent bed, additional sorbent beds can undergo desorption during that (extended) time.

In some example embodiments of the invention, the systems for separating carbon dioxide ($CO_2$) from ambient air while regenerating a desiccant reactor operate continuously by drawing a second ambient air stream into the direct air capture plant along a second flow path, where the second flow path is in a direction opposite to the first flow path. The second drawn-in ambient air stream is received in a portion of the second desiccant reactor to create a second relatively dry inlet gas stream, and the second relatively dry inlet gas stream is received in a second solid sorbent bed. The second solid sorbent bed adsorbs humidity and carbon dioxide ($CO_2$) to create a second dry outlet gas stream.

The first desiccant reactor is then regenerated by receiving the second dry outlet gas stream in a portion of the first desiccant reactor and removing water from the first desiccant reactor as the second dry outlet gas stream reacts with a desiccant in the first desiccant reactor. The removed water is then re-adsorbed into ambient air.

In some example embodiments of the invention at least one of the solid sorbent beds is a zeolite bed. Additionally, in some embodiments, the systems can also include filters to clean the first ambient air stream and/or the second ambient air stream.

In some embodiments, the systems can include an air sealing separator positioned between the first flow path and the second flow path for separating the first ambient air stream from the second ambient air stream. Similarly, in some embodiments of the invention, the systems can also include an air sealing separator positioned between the first flow path and the second flow path for separating the second dry outlet gas stream from the first dry outlet gas stream.

In some example embodiments of the invention, the systems can include exhaust fans for ejecting the re-adsorbed water from the second desiccant reactor and/or the re-adsorbed water from the first desiccant reactor into ambient air.

In some example embodiments, the systems can include a heat exchanger and pump or an energy recovery unit for transferring thermal energy generated from the adsorption of water in the first desiccant reactor to the dry stream exiting the first solid sorbent bed.

As outlined above, in some examples, the first desiccant reactor and/or the second desiccant reactor are desiccant wheels. Further, in some embodiments, the desiccant wheels rotate between the first ambient air stream and the second ambient air stream, such that a portion of each desiccant wheel is continuously adsorbing moisture from the respective incoming ambient stream while the remaining portion of each desiccant wheel is being regenerated by reverse dry flow of the outlet air stream.

The systems and methods of the invention include direct air capture (DAC) systems for separating carbon dioxide ($CO_2$) from ambient air while regenerating a desiccant reactor. In one example embodiment of the invention, the system separates carbon dioxide ($CO_2$) from ambient air by drawing a first ambient air stream into a direct air capture plant along a first flow path and receiving the first drawn-in humid inlet gas stream in a portion of a first desiccant reactor to create a first relatively dry inlet gas stream. A solid sorbent bed receives the first relatively dry inlet gas stream, and the humidity and carbon dioxide ($CO_2$) is adsorbed in the solid sorbent bed to create a first dry outlet gas stream.

As above, in some example embodiments of the invention, a second desiccant reactor is regenerated by receiving the first dry outlet gas stream in a portion of the second desiccant reactor and removing water from the second desiccant reactor as the first dry outlet gas stream reacts with a desiccant in the second desiccant reactor. The removed water is re-adsorbed into ambient air.

In some example embodiments of the invention, the systems for separating carbon dioxide ($CO_2$) from ambient air while regenerating a desiccant reactor operate continuously by drawing a second ambient air stream into the direct air capture plant along a second flow path, where the second flow path is in a direction opposite to the first flow path. In some embodiments, a portion of the second desiccant reactor receives the second drawn-in ambient air stream and creates a second relatively dry inlet gas stream. A second solid sorbent bed of the second desiccant reactor receives the second relatively dry inlet gas stream and adsorbs humidity and carbon dioxide ($CO_2$) to create a second dry outlet gas stream.

In some example embodiments, the systems operate continuously by regenerating the first desiccant reactor. A portion of the first desiccant reactor receives the second dry outlet gas stream, and the first desiccant reactor removes water as the second dry outlet gas stream reacts with a desiccant in the first desiccant reactor. The removed water is re-adsorbed into ambient air.

In some example embodiments of the invention, at least one of the solid sorbent beds is a zeolite bed. Additionally, in some embodiments, the systems can also include filters for filtering the first ambient air stream and/or the second ambient air stream.

In some embodiments, the systems can include an air sealing separator positioned between the first flow path and the second flow path for separating the first ambient air stream from the second ambient air stream. Similarly, in some embodiments of the invention, the systems can also include an air sealing separator positioned between the first flow path and the second flow path for separating the second dry outlet gas stream from the first dry outlet gas stream.

In some example embodiments of the invention, the systems can include exhaust fans for ejecting the re-adsorbed water from the second desiccant reactor and/or the re-adsorbed water from the first desiccant reactor into ambient air.

In some example embodiments, the systems can include a heat exchanger and pump for transferring thermal energy generated from the adsorption of water in the first desiccant reactor to the dry stream exiting the first solid sorbent bed.

In some examples, the first desiccant reactor and/or the second desiccant reactor are desiccant wheels. Further, in some embodiments, the desiccant wheels rotate between the first ambient air stream and the second ambient air stream, such that a portion of each desiccant wheel is continuously adsorbing moisture from the respective incoming ambient stream while the remaining portion of each desiccant wheel is being regenerated by reverse dry flow of the outlet air stream.

BRIEF DESCRIPTION OF THE DRAWINGS

The present invention is illustrated by way of example and not limitation in the figures of the accompanying drawings, and in which:

FIG. 7A shows an example continuous air-drying process using reverse dry regeneration and a rotating desiccant wheel with equal segments for adsorption and desorption;

FIG. 7B shows an example continuous air-drying process using reverse dry regeneration and a rotating desiccant wheel with unequal segments for adsorption and desorption;

DETAILED DESCRIPTION

The present invention utilizes a continuous reverse dry flow regeneration process to efficiently and economically regenerate a desiccant bed without adding any thermal energy. Additionally, the Assignee's co-pending U.S. patent application Ser. No. 17/823,024, entitled "A Temperature Vacuum Swing Adsorption Process Suited for Carbon Capture to Regenerate Sorbents using the CO2 Product Gas as the Heat Transfer Medium," filed on Aug. 29, 2022, is hereby incorporated by reference in its entirety.

Figure 1:
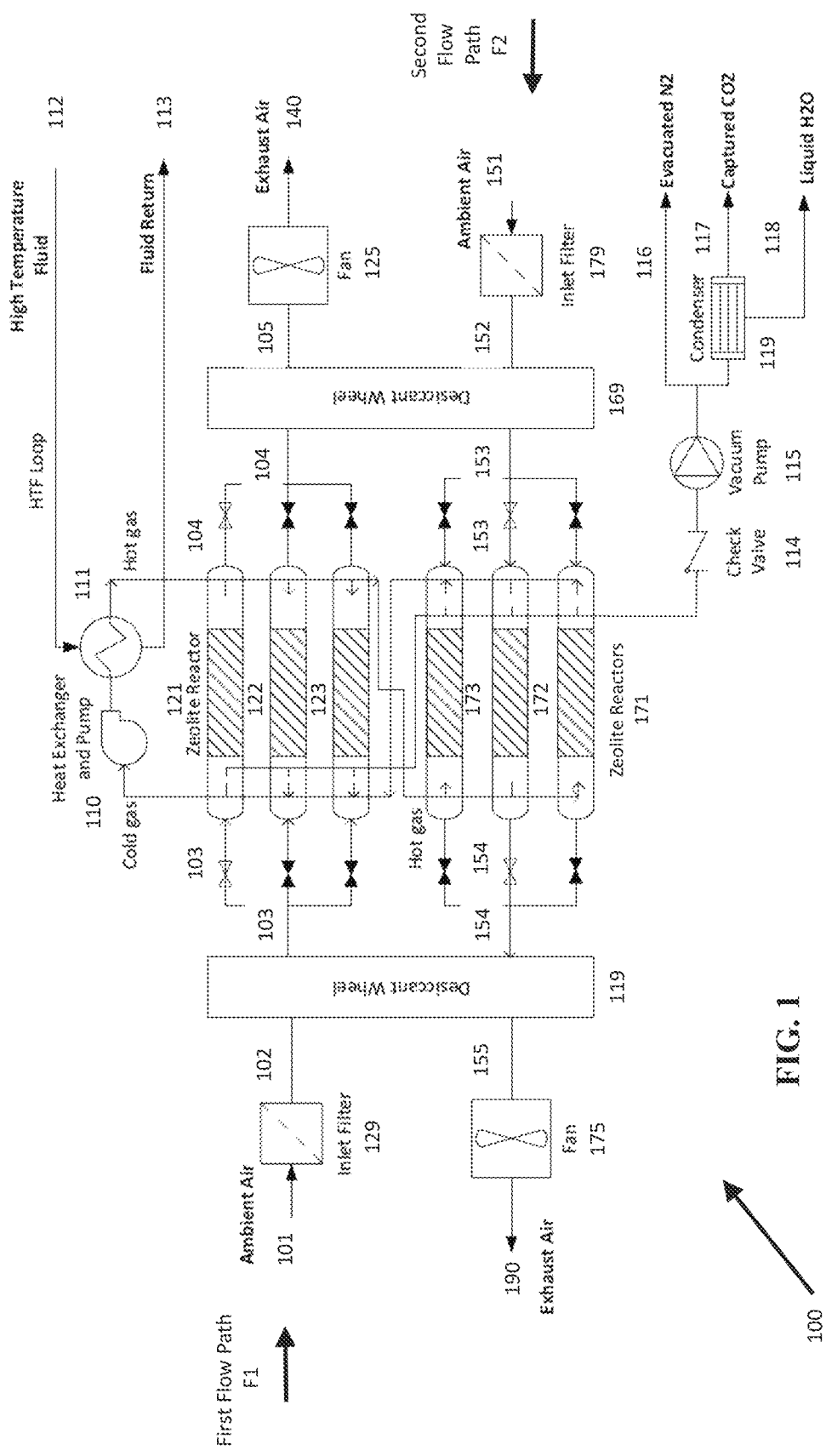
FIG. 1 is an example functional block diagram of a direct air capture (DAC) plant showing a process flow in accordance with the invention.
Figure 2:
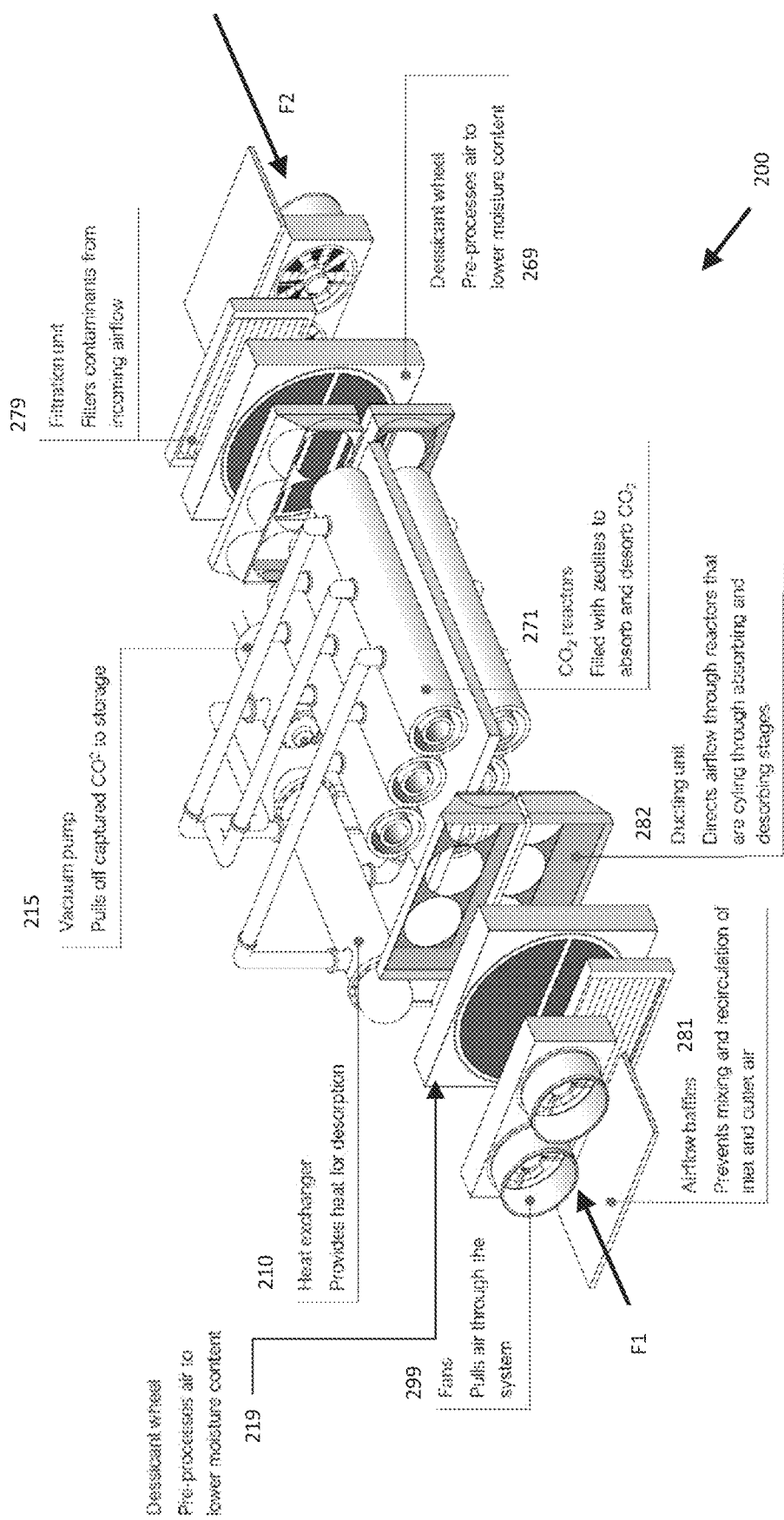
FIG. 2 is an example diagrammatic illustration of a direct air capture plant in accordance with the invention.

The invention leverages 1) water concentration differences in stream flows; 2) water concentration profile across a desiccant bed; and 3) exothermic water adsorption for the separation of gases, such as the removal of $CO_2$ from air in a direct air capture process. FIGS. 1 and 2 show an example process flow diagram for a direct air capture (DAC) plant 100 in accordance with the invention. The carbon capture process includes two general steps, Adsorption and Desorption as described below.

Figure 20:
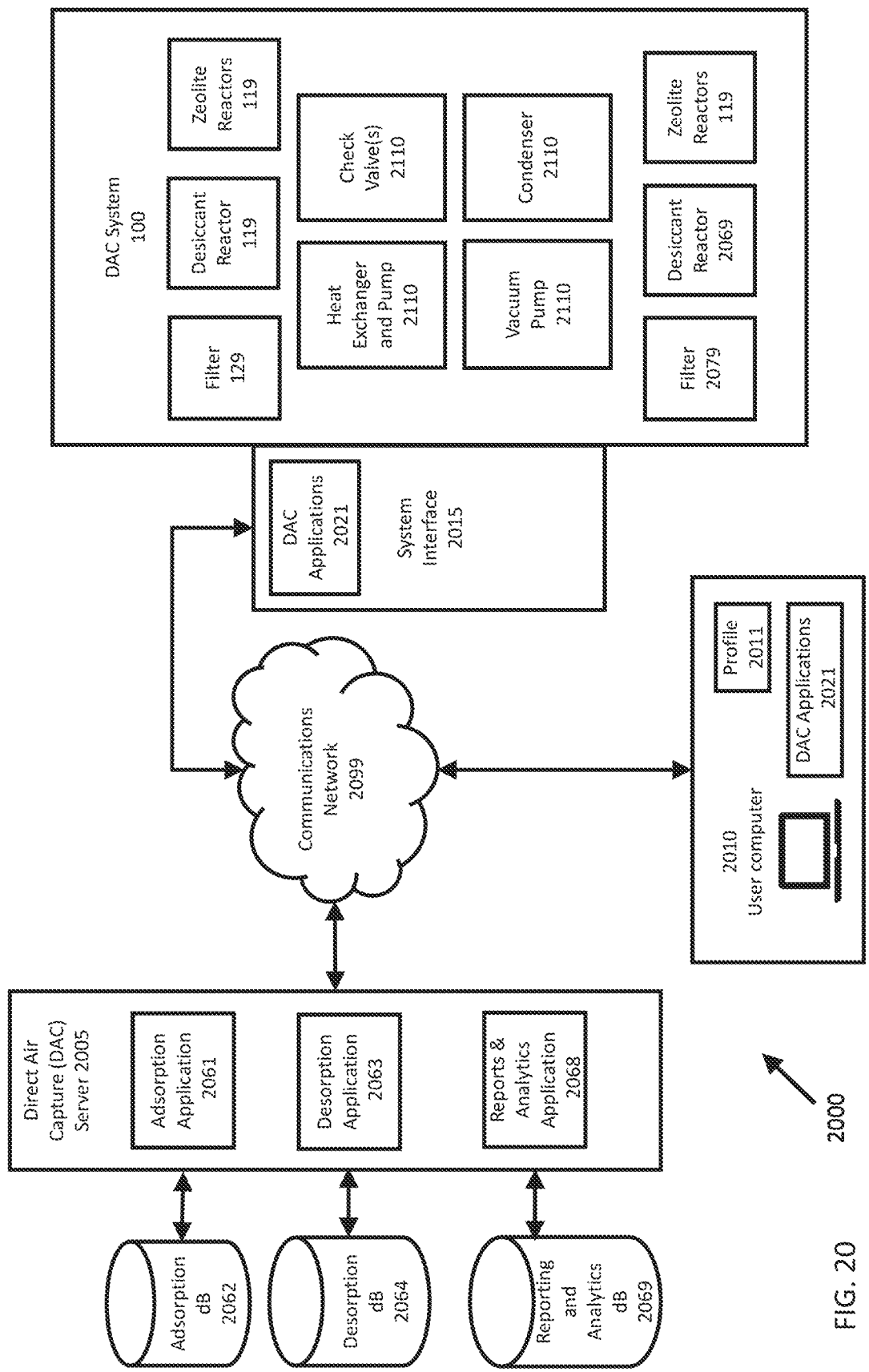
FIG. 20 shows an exemplary system diagram of a computer-based direct air capture system in accordance with the invention.

One example system 2000 includes the components of the DAC plants (e.g., 100, 200, 800) as well as DAC computer server 2005, user computer 2010, system interface 2015, and communications network 2099 shown in detail in FIG. 20. DAC computer server 2005 works in tandem with the other system components to automate the direct air capture processes outlined in the disclosure. Details regarding the computer systems are provided below in the Computer System Overview.

Figure 19:
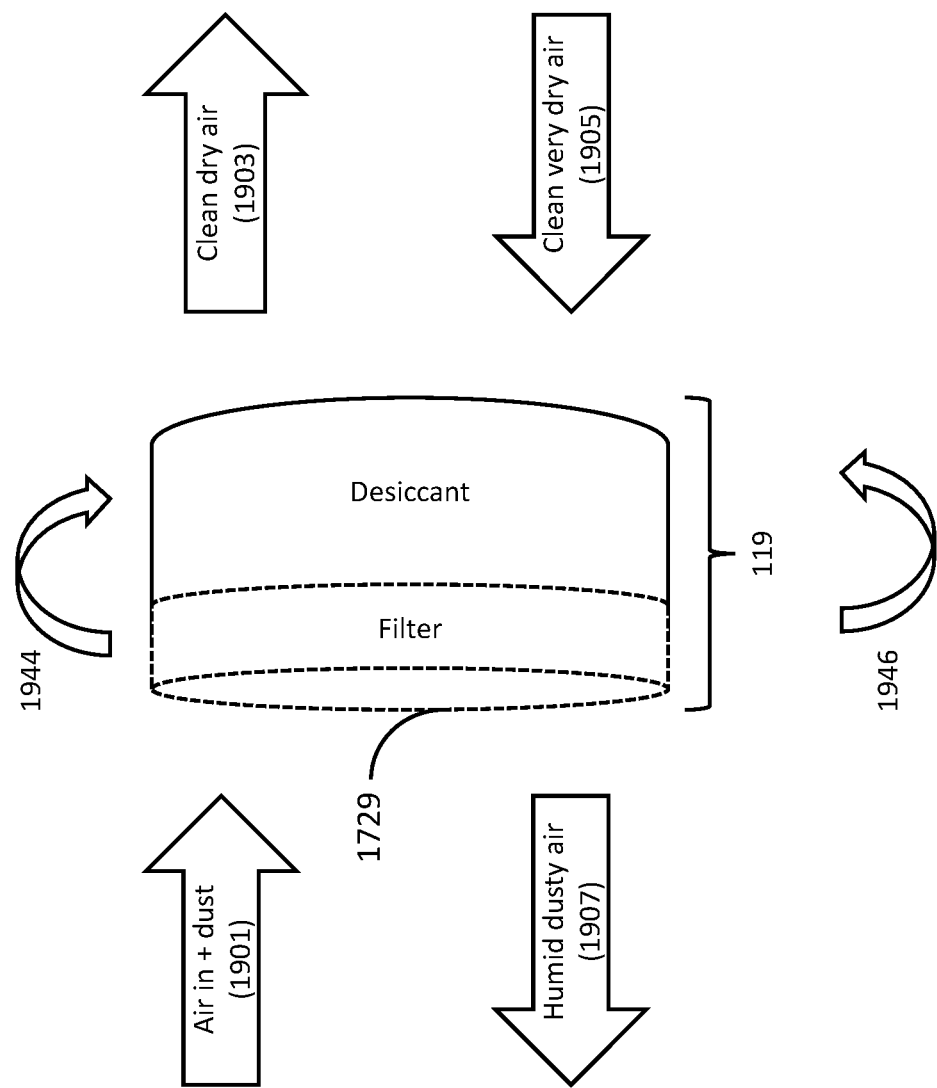
FIG. 19 illustrates an exemplary desiccant wheel integrated with a filter in accordance with the invention.

As shown in FIG. 1, in the adsorption steps, ambient air 101 is drawn into the direct air capture (DAC) plant along a first flow path F1 and cleaned from particulates by passing the ambient air 101 through a(n optional) filter 129 to create filtered ambient (humid) air 102. In parallel, in a second flow path F2 in the opposite direction from flow path F1, ambient air 151 passes through (optional) filter 179 to create filtered ambient (humid) air 152. The desiccant (wheel) filters 129, 179 can be standalone filtration units that are separate from the desiccant wheels or can be integrated with the desiccant wheels as shown in detail in FIG. 19. Separate filters need to be cleaned (e.g., when the filters are permanent) and/or replaced (e.g., when the filters are disposable). Integrated filters can be attached to the outside of the desiccant wheel(s) and rotate along with the wheel(s) and can be cleaned and dried by reverse-flow regeneration. The example integrated filter 1729 shown in FIG. 19 removes particulate matter from the air. It accomplishes this in much the same away that the desiccant wheel itself works. A desiccant wheel operates by having ambient air flowed through the top half of the wheel. The desiccant wheel then removes the water vapor in the air and dry air exits the desiccant wheel. On the bottom half of the wheel, heated or dry air is flowed into the wheel from the opposite from direction. This causes water to desorb from the desiccant wheel and a stream of humid air then exits the desiccant wheel. The wheel then spins allowing the desiccant to continuously adsorb and desorb water. As shown in FIG. 19, the systems and methods of the invention extend this concept by adding an additional filter (layer) that is shown as reference numerals 129 and 179 in FIG. 1. For brevity, in FIG. 19, the filter is shown as reference numeral 1729. The additional filter 1729 added to the desiccant wheel can remove particulates from the air. With the filters the incoming air has the particulates removed, and the effluent air can then regenerate the filter 1729 because the flow is reversed. FIG. 19 shows "air in+dust" 1901 moving through a portion of the desiccant wheel 119 with integrated filter 1729. After moving through the desiccant wheel 119 with integrated filter 1729, clean dry air 1903 exits. The curved arrows 1944, 1946 represent rotation of the desiccant wheel 119 with integrated filter 1729. As the desiccant wheel 119 with integrated filter 1729 rotates, clean very dry air 1905 regenerates the filter 1729, and humid dusty air exits.

Returning to FIG. 1, the process continues as the ambient (humid) air 102 enters a first desiccant reactor 119 (in flow path F1) and a second desiccant reactor 169 (in flow path F2) where a large fraction of the humidity is removed to create a first relatively dry inlet gas stream 103 (in flow path F1) and a second relatively dry inlet gas stream 153 (in flow path F2). Next, the relatively dry inlet gas streams 103, 153 enter their respective a zeolite reactors 121 (in flow path F1) and 171 (in flow path F2) where the remaining humidity and $CO_2$ are adsorbed. Air that exits the zeolite reactors 121, 171 is completely dry and slightly heated, as represented by first dry outlet gas stream 104 and second dry outlet gas stream 154 in flow paths F1 and F2, respectively. This dry and slightly heated air is a favorable condition in which to regenerate another desiccant bed. Therefore, the first dry outlet gas stream 104 and second dry outlet gas stream 154 in flow paths F1 and F2, respectively, are passed through another desiccant reactor 169 in flow path F1 and 119 in flow path F2, where water is removed from the desiccant beds (in the desiccant reactors) and re-adsorbed by air, as shown by reference numerals 105 and 155, respectively.

Taking advantage of the dry and slightly heated air exiting the zeolite reactors to regenerate desiccant beds is one feature of the present invention, which leads to extensive savings in energy costs.

Figure 3:
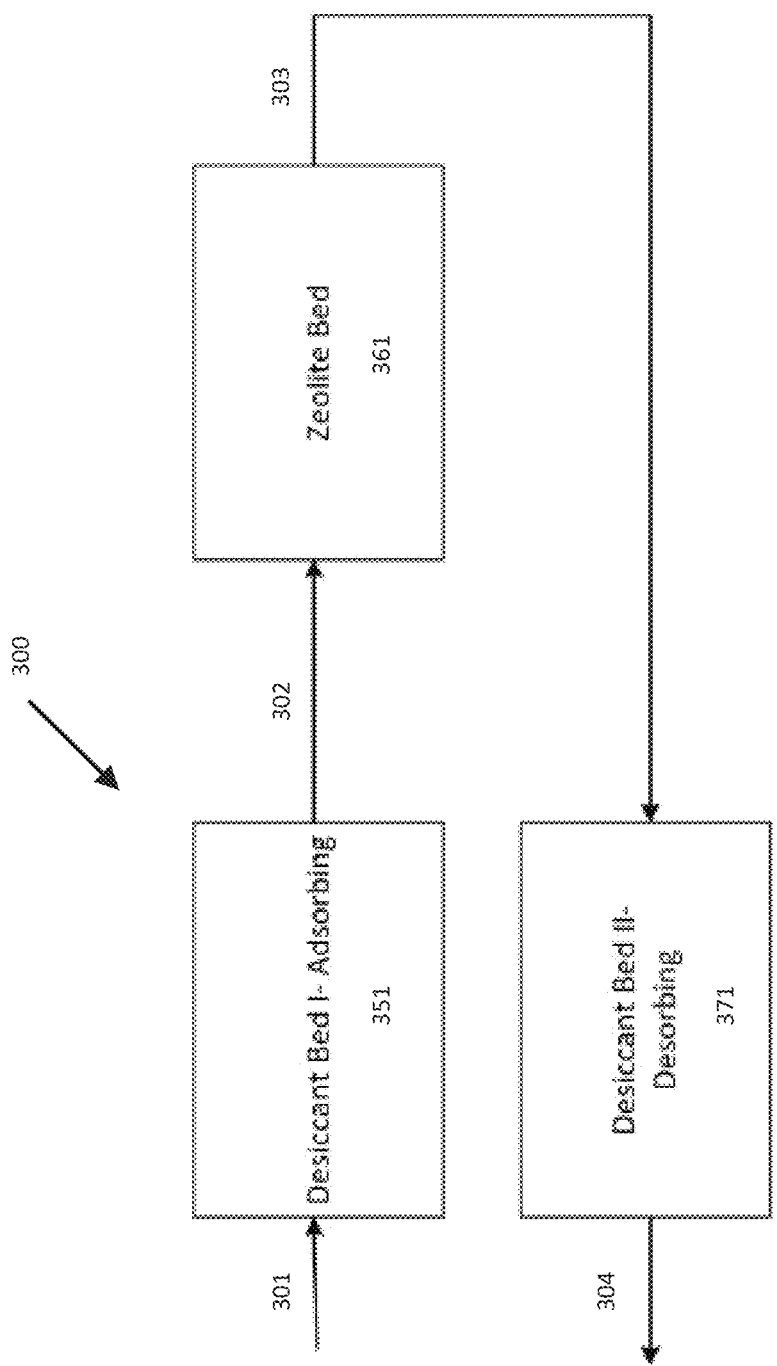
FIG. 3 shows an example process flow for reverse dry regeneration of a desiccant bed in accordance with the invention.
Figure 5:
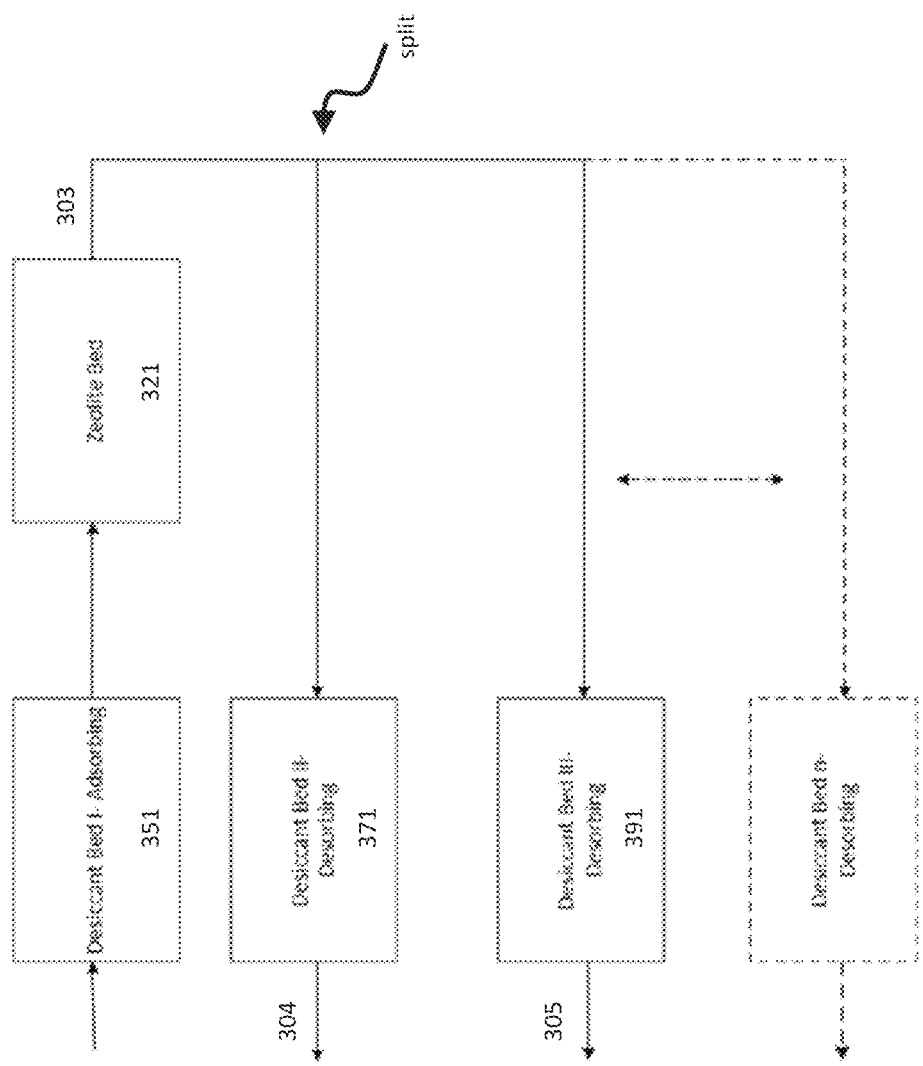
FIG. 5 shows an example splitting of a dry flow between multiple beds undergoing reverse dry regeneration.
Figure 6:
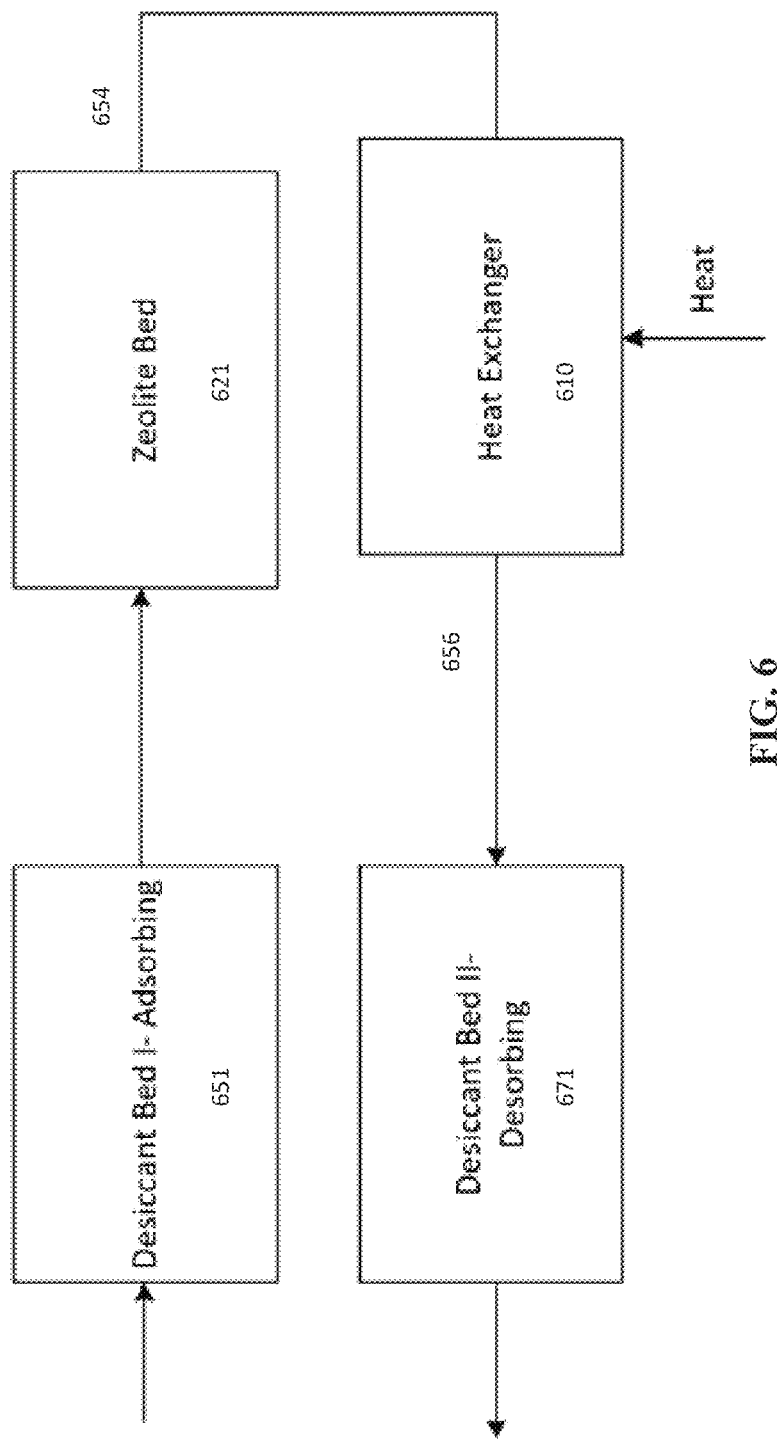
FIG. 6 shows a reverse dry flow regeneration assisted by heat addition.
Figure 8:
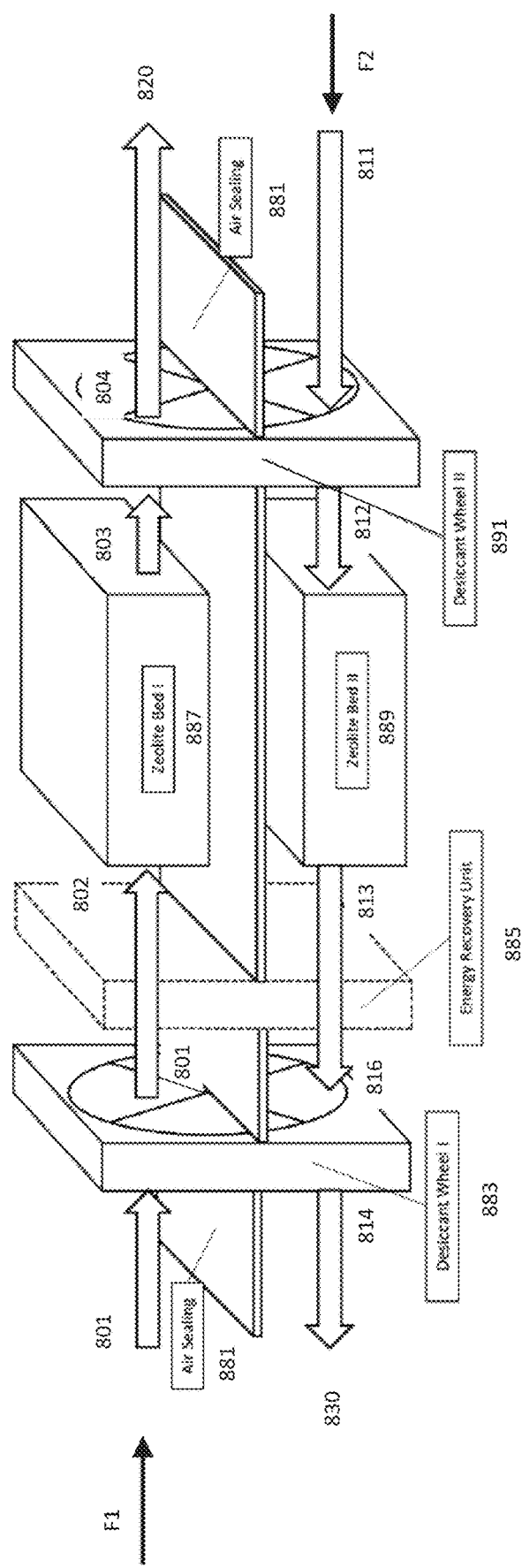
FIG. 8 shows an example general layout of a direct air capture (DAC) unit utilizing a continuous reverse dry flow regeneration scheme in accordance with the invention.

Also, in some example embodiments, using a desiccant wheel instead of a packed bed enables continuous operation of the dehydration units (e.g., desiccant wheels 119, 169 in FIGS. 1 and 8 and desiccant beds 351, 371, 391, 651, 671 in FIGS. 3, 5, and 6). The timing of the operation of the two desiccant wheels can be adjusted in a way that the ambient (humid) air 102, 152 always enters a portion of the wheel that is regenerated and ready for water adsorption. See FIGS. 7A and 7B and the section entitled "Continuous reverse dry flow regeneration process" below for additional details. Additionally, the dry and slightly heated air (i.e., first dry outlet gas stream 104 and second dry outlet gas stream 154 in flow paths F1 and F2, respectively) always passes through a section of the respective desiccant wheel that is filled with water and requires regeneration. Therefore, using continuously rotating wheels with lags between their operation makes the dehydration process continuous, which results in savings in capital costs.

As further shown in FIG. 1, the desorption process proceeds in parallel to the adsorption process. While two zeolite reactors 121, 171 shown in FIG. 1 are going through adsorption, the remaining four reactors 122, 123 (in flow path F1) and 172, 173 (in flow path F2) are being regenerated. The regeneration of the zeolite sorbent beds in the reactors is done using a combination of vacuum and heat. First, vacuum is applied to the reactors 122, 123, 172, 173, which leads to removal of air in the dead space of the respective reactors 122, 123, 172, 173 as well as removal of nitrogen from the zeolite (bed). Next, the bed is heated to a temperature that $CO_2$ and water are desorbed. The range of desorption temperatures is somewhat dependent on the particular zeolite used and is usually somewhat different for water and $CO_2$. There is also a trade-off between speed (higher temperature) and cost (lower temperature). In some example embodiments of the invention, the bed is heated to a temperature of approximately 150-350° C. In some example embodiments of the invention, the bed is heated to a temperature of approximately 250-325° C. In some embodiments of the invention using 13X as the sorbent, the bed is heated to a temperature of about 300° C. Water can also be removed from the desorbed streams by passing the streams through a condenser, such as condenser 119.

The bed (in reactors 122, 123, 172, 173) can be heated using internal heat exchangers in the reactors. However, the low thermal conductivity of zeolite requires the heat exchanger pipes to be very close to each other, which leads to high heat exchanger surface area and capital cost. Alternatively, zeolite can be heated by recirculating a hot gas through the bed. The choice of the heating gas affects the purity of the desorbed stream. Below is the summary of desorption steps:

First, a vacuum is applied to the zeolite bed to remove nitrogen from the zeolite bed as well as from the air in the dead space of the reactor. The nitrogen is evacuated as shown by reference numeral 116. Second, a heating step is performed where the reactor 122, 123, 172, 173 is pressurized and heated with flowing hot $CO_2$ stream, as shown by reference numeral 116. Third, another vacuum step is performed where a vacuum is applied again after the bed reaches the desired temperature. This results in removing all the $CO_2$ from the bed including[the amount adsorbed during heating as shown in 117. Lastly, a condensation step is performed where the water from the desorbed stream is condensed out at 118 to increase the purity of captured $CO_2$.

FIG. 2 shows a perspective view of a DAC system 200 in accordance with the invention. Extending the schematic diagram of FIG. 1, the DAC system 200 shown in FIG. 2 highlights fans 299 that pull air through the system 200 along flow path F1 as well as desiccant wheel 219 that removes humidity from the first drawn-in ambient air stream to create a first relatively dry inlet gas stream. Ducting unit 282 directs airflow through the reactors 271 that are cycling through absorbing and desorbing stage. In some example embodiments, reactors 271 are filled with zeolites to absorb and desorb $CO_2$. Heat exchanger 210 provides heat for desorption, and vacuum pump 215 pulls off captured $CO_2$ to storage. FIG. 2 shows a continuous regeneration system, with a second desiccant wheel 269 that receives ambient air via filtration unit 279 and preprocesses it to a lower moisture content in flow path F2 and passes the relatively dry inlet gas stream. The airflow baffles 281 sealing and separate inlet streams from $CO_2$-depleted outlet streams to prevent mixing and recirculation of inlet and outlet air.

Reverse Dry Flow Regeneration.

A simplified two-stage system 300 with an inlet stream 301 and an outlet stream 304 is shown in FIG. 3. As a first step, a desiccant bed 351 dries ambient air 301 to a lower humidity level to create a relatively dry inlet gas stream 302. Examples of potential desiccant materials used in the desiccant bed include silica gel, alumina, zeolites, SAPO, and ALPO.

Next, the (relatively dry inlet gas) stream 302 enters the zeolite bed 361 where $CO_2$ is being adsorbed. Because zeolites have a high affinity for water, the dry outlet gas stream 303 leaves the zeolite bed 361 almost completely dry. Note that in both the desiccant bed 351 and zeolite bed 361, the heat released due to water adsorption increases the stream's exit temperature.

Finally, the dry, heated, $CO_2$-depleted stream (dry outlet gas stream) 303 flows to a desiccant bed 371 to regenerate the adsorbent, and the stream 304 leaves desorbing desiccant bed 371. To make the regeneration process more effective, the direction of the flow (flow path) during regeneration is opposite to the direction of the flow during adsorption. The effectiveness of this regeneration is determined by the shape of water profile in the desiccant bed at the end of the adsorption process as shown in FIG. 4.

To avoid overloading the zeolite bed with water, the adsorption process is stopped when the desiccant bed exit humidity reaches a predetermined value. This value is typically chosen such that the average moisture content of the pre-dried airstream is 5-15% of the ambient condition. At this point, the desiccant is not fully saturated; rather, a concentration gradient exists across the bed. By entering the regeneration flow from the opposite direction, the bed is exposed to the driest air in the area of lowest concentration and water is more effectively removed from the area with high water concentration (e.g., the bed entrance). As moisture is desorbed into the regeneration air stream, the desorption stream is wettest when exposed to the highest concentration of adsorbate on the desiccant. This ensures that there is always a significant difference between the amount of water adsorbed on the bed and the equilibrium concentration based on the regeneration airstream. Thus, desorption of water is promoted across the entire length of the bed.

Figure 4:
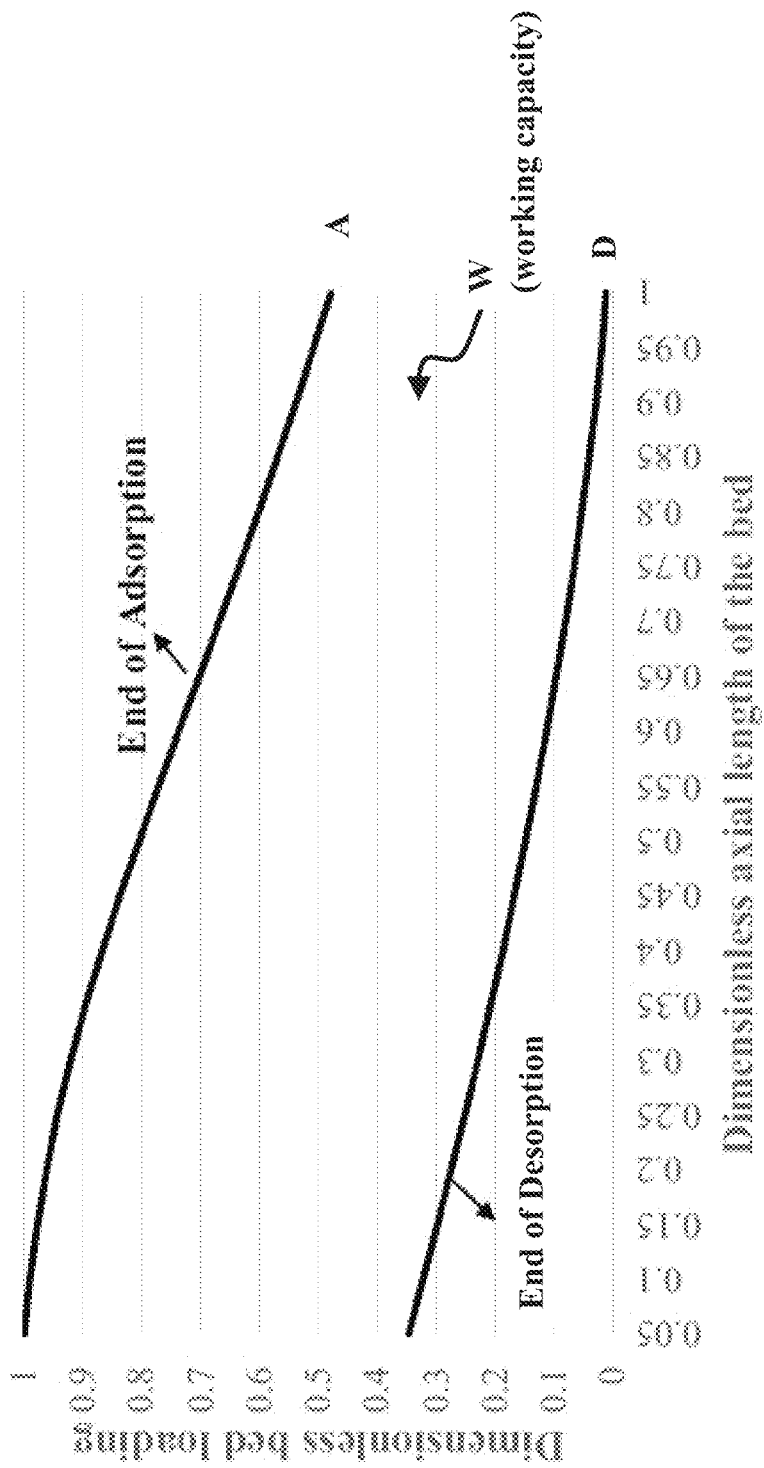
FIG. 4 shows an example water concentration profile across a desiccant bed at the end of adsorption and desorption steps.

FIG. 4 depicts the water concentration profile at the end of adsorption (A) and desorption (D) steps after few cycles. The area between the two curves (A) and (D) depicts the working capacity (W) of the desiccant. Although this area is smaller than the whole area below the concentration curve at the end of adsorption (A), which represents the maximum capacity of the desiccant, it is achieved without the cost of adding external heat due to the water concentration difference between the exit of the desiccant bed and the dry air generated by the zeolite bed, the water concentration profile across the desiccant bed, and elevated temperatures due to exothermic heat of adsorption of water.

It is noteworthy that although the temperature increases due to heat of (exothermic) adsorption in the desiccant wheel(s) and zeolite reactor(s) improves the regeneration effectiveness, the process still works well with reverse dry flow at ambient temperature as evident in the examples described below.

The adsorption and desorption of the zeolite reactors can resemble that of a typical TVSA process. A typical cycle is 45 minutes for adsorption and 45 minutes for desorption. In one embodiment of the invention, there are two zeolite reactors per flow path, such that one of the two reactors is adsorbing while the other is sealed and desorbing. This synchronized cycle time allows for continuous intake of ambient air at a constant flow rate. In total, this means that two of the four zeolite reactors are in adsorption, while the other two are being evacuated and heated in a desorption process.

However, in favorable ambient conditions, the zeolite has a higher working capacity that may permit up to a 90-minute adsorption time, with a similar 45-minute desorption time. In this case, during part of the operation, both zeolite reactors will be in adsorption, and the total air passing through each desiccant wheel is doubled from the nominal airflow. In this state, the drying performance of the desiccant wheel is adversely affected due to the lower residence time through the wheel and increased pressure drop due to faster airflow. However, this doubling of airflow is an optional process variation and can be enabled when the overall process economics are favorable to do so (such as when absolute humidity is very low and less air drying is needed). Alternatively in this situation, a third zeolite reactor could be added to the system where two of the reactors will be in adsorption while the third is undergoing desorption.

Once a zeolite reactor is finished adsorbing, the reactor is sealed and evacuated. One example zeolite desorption process is shown below in Table 1.

TABLE 1

Zeolite Desorption Process

| Step | Time | Description |
| --- | --- | --- |
| Evacuation to 0.05 bar | 5 minutes | The chamber is evacuated using a pump at ambient temperature. This removes dead air from the reactor and desorbs almost all of the $N_2$ that is co-adsorbed onto the zeolite, without desorbing $CO_2$ or $H_2O$. |
| Heating to 300 C. | 35 minutes | The chamber is heated while maintaining vacuum by flowing hot oil through finned tubes that are interspersed throughout the pellet beds. At approximately 150 C., $CO_2$ will begin to desorb; at about 225 C., $H_2O$ begins to desorb. Both of these products are collected through the vacuum pump. |
| Cooling to ~80 C. | 5 minutes | The chamber is cooled using ambient airflow. In future iterations, it may be possible to enhance cooling by flowing colder fluid through the integrated heat exchanger, which may allow for sensible heat recovery. However, the initial system assumes this heat is lost to the incoming airflow. |

Once the bed is below about 80° C. (the specific value can vary based on the specific sorbent used) $CO_2$ starts adsorbing on the (zeolite) pellets and the next adsorption has effectively begun. The ambient air flow will continue to cool the sorbent until adsorption restarts, and the process can continue until reaching an equilibrium point between the cooling effect of the flowing air and the adsorption heat given off. Further, the high flow rate of the adsorption stream continues to cool the (zeolite) bed quickly enough such that the bed does not need to be previously cooled to ambient temperature to effectively adsorb the $CO_2$.

Because the gas that is desorbed contains a mixture of $CO_2$ and water at elevated temperatures, a condenser and intercooler system (reference numerals 110, 111, 114, 115, 119 shown in FIG. 1) can be used to lower the temperature of the desorption stream and separate the product $CO_2$ from the desorbed water.

In an alternative embodiment of the invention, due to the low amount of moisture entering the zeolite bed, one or more low-temperature desorption cycles can be implemented in between a "deep regeneration." These low-temperature desorptions can raise the zeolite to some temperature (typically 150-200° C.) that is sufficient to desorb the majority of $CO_2$, but insufficient to desorb the co-adsorbed water. The water adsorbed in the bed largely remains for the next cycle, which reduces $CO_2$ capacity. However, energy is saved by not requiring as high a temperature for desorption, and a lower-quality heat source or recuperated heat can be utilized. Depending on ambient conditions, it can be economical to execute a number of low-temperature desorptions before a deep regeneration that occurs at higher temperature and fully regenerates the bed by desorbing the $H_2O$. This scheme can also be applied when external factors are favorable, such as reserving the deep regenerations for daytime when cheap solar heat is more widely available.

The reverse dry flow regeneration systems and methods in accordance with the invention provide a cost-effective method to utilize low-cost commercial adsorbents for $CO_2$ removal. Using the method for regenerating desiccants, the energy requirements associated with removing water can be lowered by as much as 75%, enabling the use of commercially available, long-lasting zeolites as the $CO_2$ removal sorbent.

The following modifications of the above reverse dry flow regeneration scheme are also effective. The modifications shown in FIG. 5 include 1) splitting the dry air 303 exiting from the zeolite bed 321 between multiple desiccant beds 371, 391 undergoing the regeneration and then re-adsorbing the removed water into ambient air at 304, 305.

Additionally, FIG. 6 shows a modification where the regeneration temperature can be further increased by adding heat sources (such as heat exchanger 610) between zeolite bed 621 and desorbing desiccant bed 671 utilizing low temperature solar or waste heat resources. In these example embodiments, the temperature of the stream 654 leaving the zeolite bed 621 is raised to a higher temperature as the stream 656 enters the desorbing bed 671.

Another modified example embodiment of the invention runs the desiccant beds in a batch process (without desiccant wheels) by redirecting incoming and outgoing airstreams or by running a discontinuous process with airflow going one direction at a time.

Further FIGS. 7A, 7B, and 8 show continuous dehydration processes where the desiccant beds are replaced with rotating desiccant wheels as further explained below.

Continuous Reverse Dry Flow Regeneration Process.

The desiccant beds presented in the previous sections can be in the form of a packed bed, monolith structure, wheel, or alternative structured arrangement that may combine a sorbent and substrate. Because the desiccant system requires no heat input, the typical cyclical thermal energy penalty of using an inert substrate to house the sorbent does not apply to the systems in accordance with the invention. As shown in FIGS. 7A, 7B, and 8, utilizing rotating desiccant wheels 703, 704, 883, 891 instead of stationary beds enables continuous operation of the dehydration units. Furthermore, as depicted in FIGS. 7A and 7B, the area of the wheel dedicated to adsorption (783 in FIG. 7A) and desorption (791 in FIG. 7A) does not have to be equal. FIG. 7B shows a larger area of the wheel dedicated to adsorption 784 than desorption 792 and can be optimized depending on the process conditions.

FIG. 8 shows a general layout of an exemplary direct air capture (DAC) system 800 for separating humid inlet streams (e.g., ambient air) from dry outlet streams. The exemplary system in FIG. 8 provides a continuous reverse dry flow regeneration process. FIG. 8 shows in adsorption, ambient air at 801 is drawn into the system along flow path F1 and is optionally cleaned from particulates by passing through a filter (not shown). Next, the humid air enters a desiccant reactor (desiccant wheel) where 80-95% of the humidity is removed, as represented in FIG. 8 by the first air flow moving from 801 to 802 and ambient air 811 in the second, opposite-direction flow path F2 moving from 811 through desiccant wheel 891 to 812. The timing of the operation/rotation of two desiccant wheels 883, 891 can be adjusted such that the air at state 801 or 811 always enters a portion of the wheel(s) 883, 891 that is regenerated and ready for water adsorption. The air sealing 881 shown in FIG. 8 is akin to an airflow baffle and separates inlet streams from $CO_2$-depleted outlet streams along flow paths F1 and F2 to prevent mixing and recirculation of inlet and outlet air. When the air flows move from 801 to 802 in flow path F1 and from 811 to 812 in flow path F2, a first relatively dry inlet gas stream 802 is created, and a second relatively dry inlet gas stream 812 is created.

The first relatively dry inlet gas stream 802 is received in zeolite reactor (bed) 887 in flow path F1, and the second relatively dry inlet gas stream 812 is received in zeolite bed 889 in flow path F2. The respective zeolite beds 887, 889 where nearly all the remaining humidity and a large proportion of the $CO_2$ is adsorbed to create a first dry outlet gas stream (803) in flow path F1 and a second dry outlet gas stream (813) in flow path F2. The respective first and second dry outlet gas streams 803, 813 are dry and slightly warmer from the zeolite action.

Air that exits the zeolite reactor (represented by 803 and 813 is virtually completely dry and may also be slightly heated (in the range of 0-5° C.) as a result of the heat of adsorption from the $CO_2$ and moisture that is adsorbed. This air streams at 803 and 813 are now in a favorable state to regenerate another desiccant bed. The streams are then passed in reverse flow through another desiccant reactor, where water is removed from the bed and desorbed into the air stream, as represented by 804 and 814. These "other" desiccant reactors that are regenerated are those same desiccant wheels 883, 891 that were used in the adsorption steps earlier. After regenerating the desiccant wheels 883, 891, the air streams are depleted of $CO_2$ and re-humidified, and are ejected to ambient air at 820, 830.

As outlined above, the dry and slightly heated air (dry outlet gas streams 803 and 813) pass through sections of the respective desiccant wheels 883, 891 that are filled with water and require regeneration. Using continuously rotating wheels makes the dehydration process continuous, which allows constant use of equipment, increased throughput of the flow paths, and reductions in capital cost. In addition, the parallel flow nature of the design presented in FIG. 8 provides the reverse dry flow regeneration scheme without the energy penalty associated with physically reversing the flow. This is extremely important for DAC applications, where an excessive amount of air should be processed and the pressure drop budget is very limited.

In addition to the main components identified in the drawing, an energy recovery unit 885 can also be integrated into the system. In the form of a heat pump or an enthalpy wheel, an energy recovery unit 885 transfers thermal energy generated from the adsorption of water in desiccant wheel 883 to the dry stream exiting the zeolite bed 889. Using such configuration, the moisture removal efficiency from desiccant wheel 883 is further improved. In addition, the temperature of the air entering the zeolite bed will decrease, which improves the $CO_2$ adsorption capacity.

EXAMPLES

In the following examples, efforts have been made to ensure accuracy with respect to values and numbers used (e.g., amounts, temperature, etc.) but some experimental error and deviation should be anticipated. The examples do not limit the invention described in this disclosure.
General Procedures:

The reverse dry air swing regeneration process has been demonstrated at bench scale using a prototype system. The prototype simulates the large-scale processes by flowing humid air in one direction through a test desiccant bed, followed by dry air in the reverse direction, in a cyclical process of an integrated system. The inlet and outlet humidity were measured in each step and reported as parts per million by volume (ppm). This data was integrated over time to determine the amount of moisture that was adsorbed onto and desorbed from the desiccant bed in each cycle step.

A variety of desiccant materials and desiccant geometries in different environmental conditions (humidity and temperature) have been tested. The test results indicate that structured desiccants perform well compared to a packed bed, and that short cycle times (i.e. faster rotation of a desiccant wheel) of 2 minutes or less are preferred.

A schematic of the prototype reactor system is shown in FIGS. 9A-9D. This prototype is automated to perform the many fast adsorption and desorption cycles required for the desiccant to reach a cyclical steady-state equilibrium. The user inputs the gas flow rate for absorption, purge and deep regeneration, the inlet humidity for absorption, the water ppm threshold for purging, cycle time, and total cycles. Gas flow rates were reported in units of cubic feet per minute (cfm).

Figure 9B:
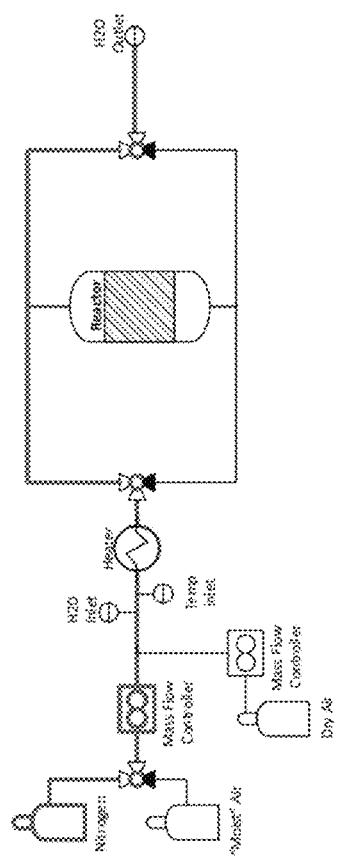
FIG. 9B is an exemplary schematic showing a prototype used to demonstrate a reverse dry air swing regeneration process showing a flow of gas during purge.
Figure 9D:
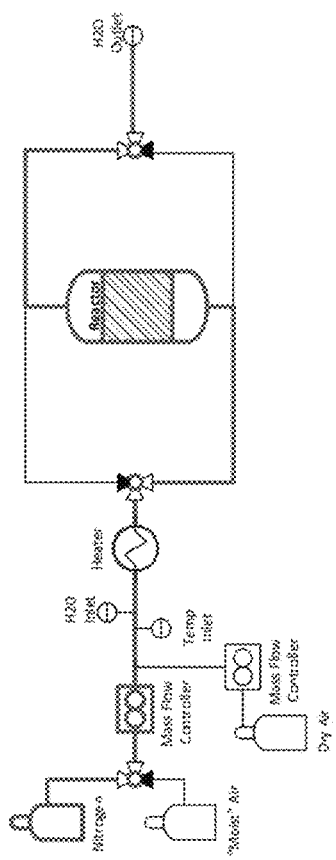
FIG. 9D is an exemplary schematic showing a prototype used to demonstrate a reverse dry air swing regeneration process showing the flow of gas during regeneration.
Figure 9A:
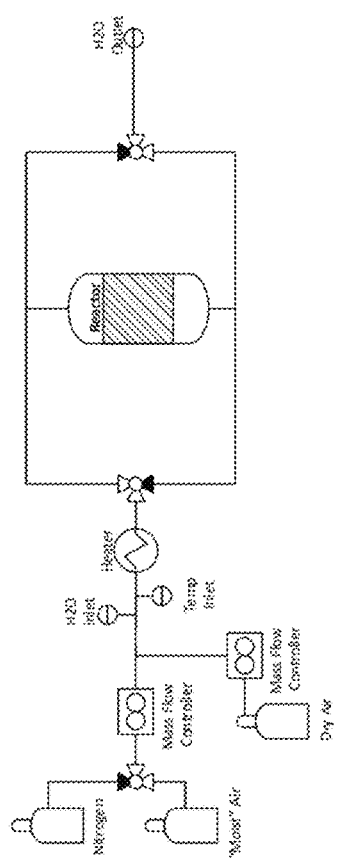
FIG. 9A is an exemplary schematic showing a prototype used to demonstrate a reverse dry air swing regeneration process where there is no flow of gas during a cycle.
Figure 9C:
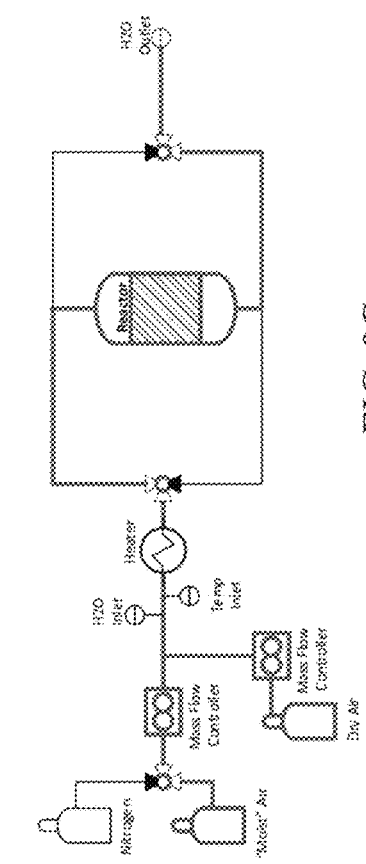
FIG. 9C is an exemplary schematic showing a prototype used to demonstrate a reverse dry air swing regeneration process showing the flow of gas during adsorption.

To operate the prototype, first a purge cycle was run with dry nitrogen gas until the output water concentration reached a specified threshold as shown in FIG. 9B. This purge cycle helped clear residual moisture from the tubing in the prototype prior to testing adsorption and desorption cycles. Next, an adsorption step was run as shown in FIG. 9C. A mass flow controller was used to mix dry and moist air to achieve the desired input humidity at the desired flow rate. This mixed air was flowed through the reactor and the inlet and outlet humidity were recorded. After a set adsorption time, a simulated dry reverse cycle was run as shown in FIG. 9D. Nitrogen at approximately 100 ppm water was used as a mimic for the dry air leaving the zeolite beds and was flowed through the bed in the opposite direction with the inlet and outlet humidity recorded. This whole process was then repeated until the number of cycles requested was completed or until the user aborted the process. A heater was included to allow testing of the impact of elevated temperature in the adsorption or desorption flows; however, in the typical use case, the heater remains off in each step.

Figure 10:
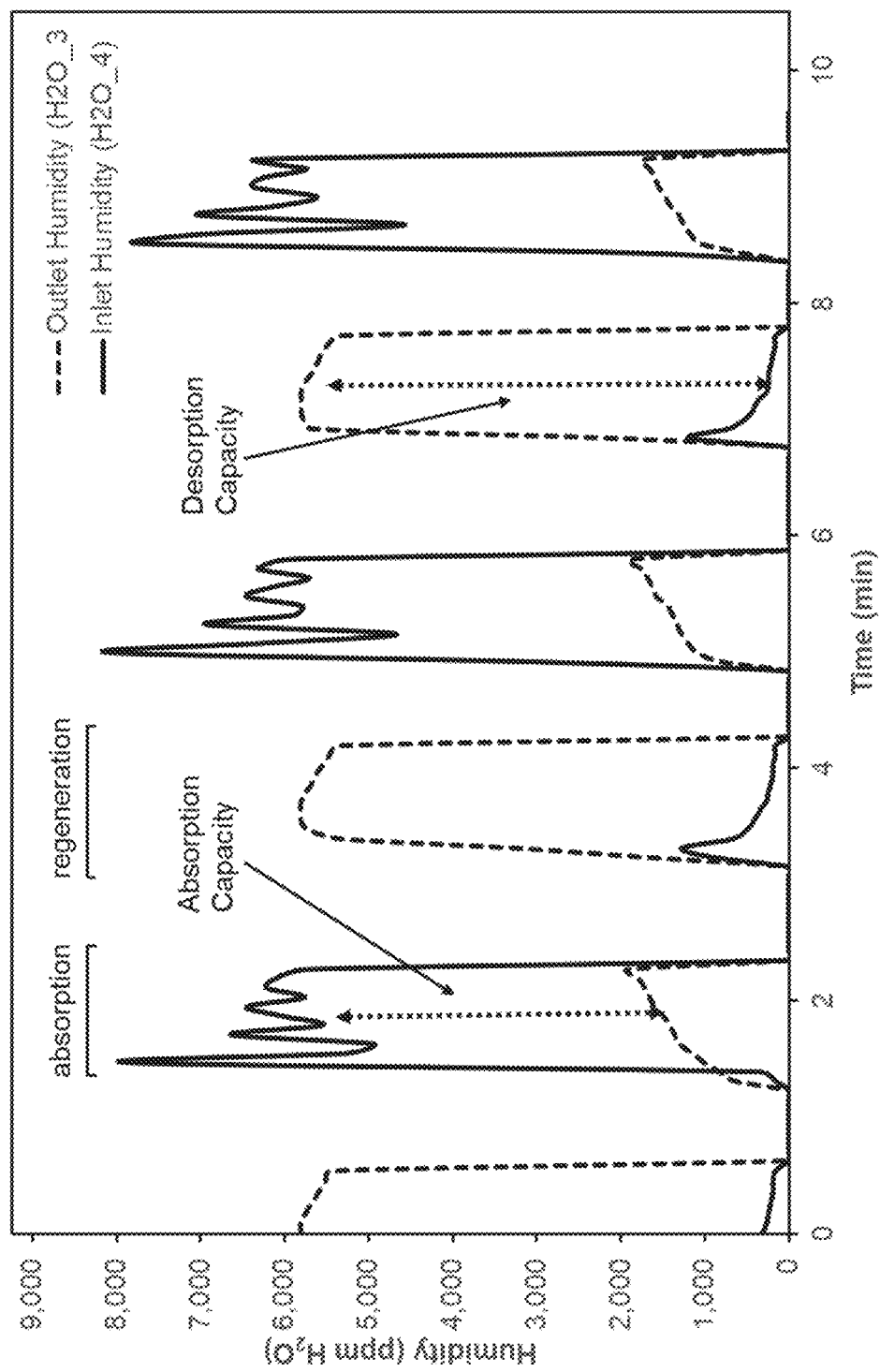
FIG. 10 shows example humidity data obtained from a reverse dry air swing prototype where H2O_3 corresponds to the inlet humidity sensor and H2O_4 corresponds to the outlet humidity sensor of FIGS. 9A-9D.

The type of data that this prototype produced can be seen in FIG. 10 (data was not collected during the purge cycle, leading to the gaps seen in the results). H2O_4 was the inlet humidity sensor and H2O_3 was the outlet humidity sensor. The inlet humidity for a given cycle was found by averaging H2O_4 during the absorption part of the cycle. The outlet humidity, (the humidity of the air going to the $CO_2$ sorbent) was found by averaging H2O_3 during the absorption cycle. The absorption capacity was proportional to the integrated area of the H2O_4 minus the integrated area H2O_3 during absorption. Similarly, the desorption capacity was proportional to the integrated area of the H2O_3 minus the integrated area H2O_4 during regeneration.

Example 1

Reverse Dry Air Swing Regeneration—Grace Silica Gel 125 Desiccant (1.8 mm Bead)

Figure 11B:
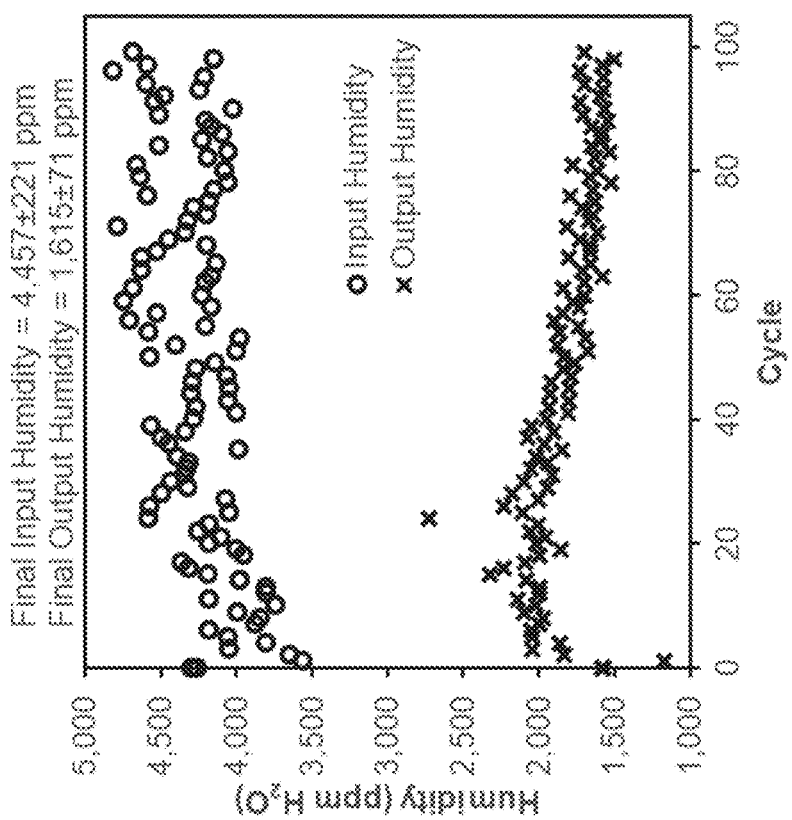
FIG. 11B shows humidity water capacity data obtained from a reverse dry air swing prototype loaded with silica gel as the adsorbent (207 g, 1.8 mm beads, 2.9-inch bed diameter, 2.4-inch bed height) and cycled at ambient temperature (24° C.) with a 4,500 ppm inlet humidity, flow rate of 8 cfm, and 2-minute cycle time.
Figure 11A:
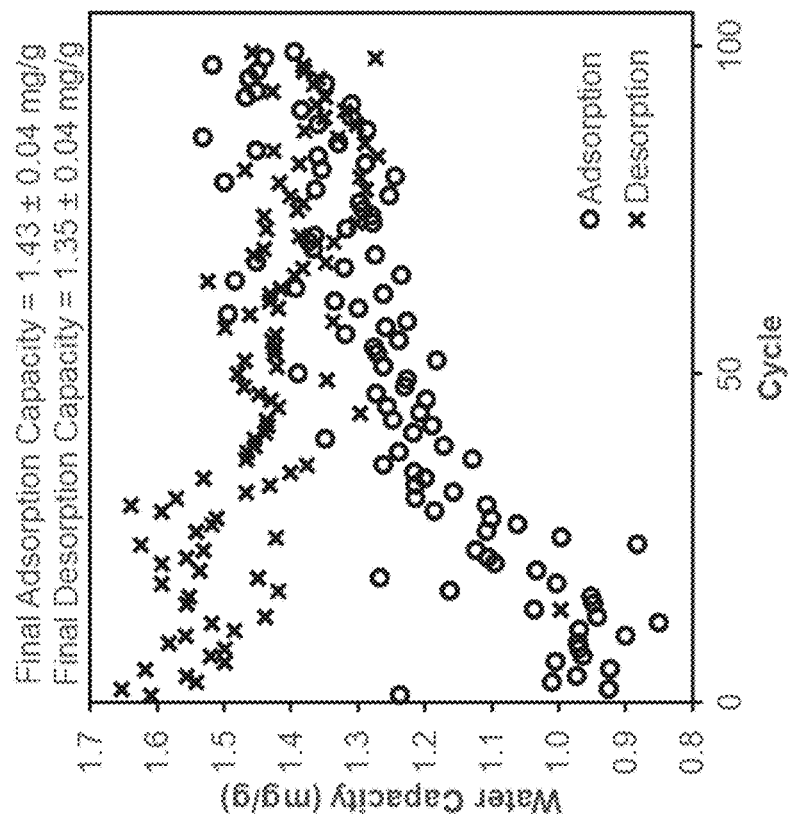
FIG. 11A shows water capacity data obtained from a reverse dry air swing prototype loaded with silica gel as the adsorbent (207 g, 1.8 mm beads, 2.9-inch bed diameter, 2.4-inch bed height) and cycled at ambient temperature (24° C.) with a 4,500 ppm inlet humidity, flow rate of 8 cfm, and 2-minute cycle time.

Readily available and inexpensive silica gel was examined as a baseline desiccant. Grace silica gel 125 (1.8 mm beads; 207 g) was loaded into the prototype reactor (2.9-inch bed diameter) to a bed height of 2.4 inches and cycled as described above with a 2-minute cycle time. During the adsorption step, air at approximately 4,500 ppm humidity was flowed through the reactor at 8 cfm at ambient temperature (approximately 24° C.). Plots showing the capacity and humidity for each cycle are shown in FIGS. 11A-11B. CC. The system is in equilibrium when the adsorption and desorption capacity are equal. At this point, the test was stopped and the data from the last 10% of cycles averaged to give the experimental results indicated in FIGS. 11A-11B. Under these conditions, the average input humidity of 4,457 ppm was reduced to 1,615 ppm at the outlet at equilibrium.

Example 2

Reverse Dry Air Swing Regeneration—Dependence on Initial Bed State

Figure 12B:
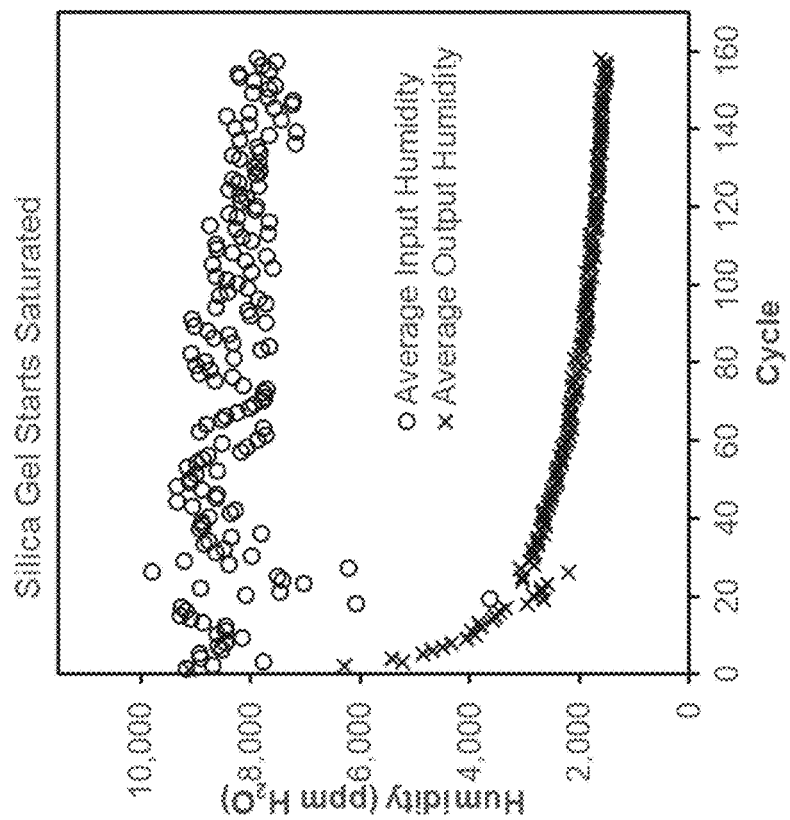
FIG. 12B shows data obtained from a reverse dry air swing prototype cycled at ambient temperature (24° C.) with an inlet humidity of roughly 10,000 ppm and a flow rate of 4 cfm and where the silica gel starts out saturated with water.
Figure 12A:
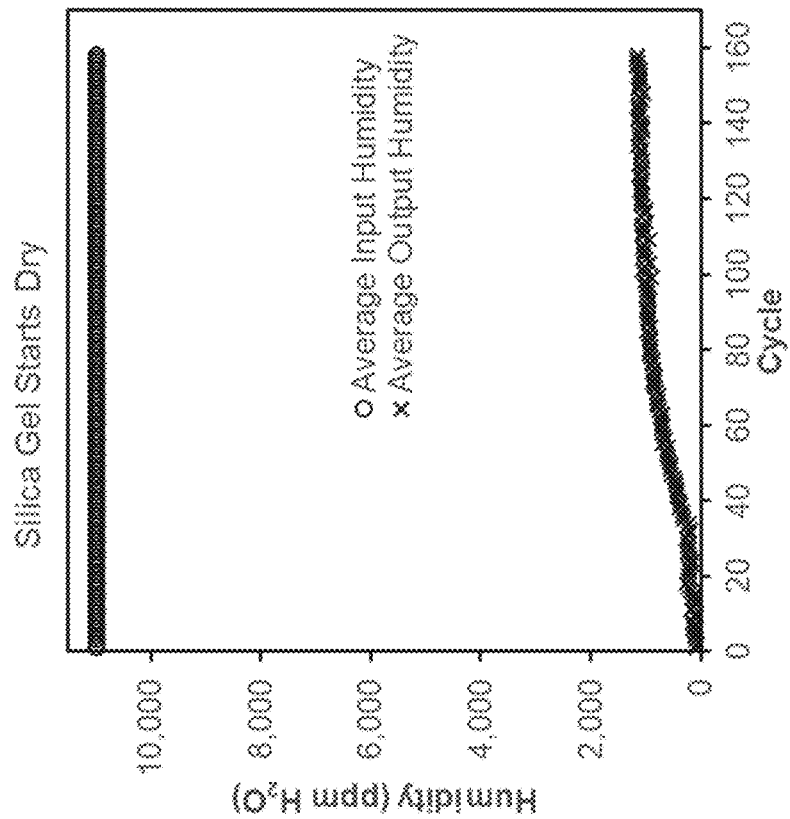
FIG. 12A shows data obtained from a reverse dry air swing prototype cycled at ambient temperature (24° C.) with an inlet humidity of roughly 10,000 ppm and a flow rate of 4 cfm and where the silica gel starts dry.

To determine if the steady-state results depend on the initial desiccant condition, cycles were performed as in Example 1 with the silica gel adsorbent in both a very dry starting condition and very wet (i.e., saturated with adsorbed water) condition except that, during the adsorption step, air at approximately 10,000 ppm humidity was flowed through the reactor at 4 cfm at ambient temperature. FIGS. 12A-12B show the results of this experiment. In both cases, the average output of the desiccant system reaches a similar low output humidity after about 150 cycles.

Example 3

Reverse Dry Air Swing Regeneration—Dependence on Humidity

Figure 13:
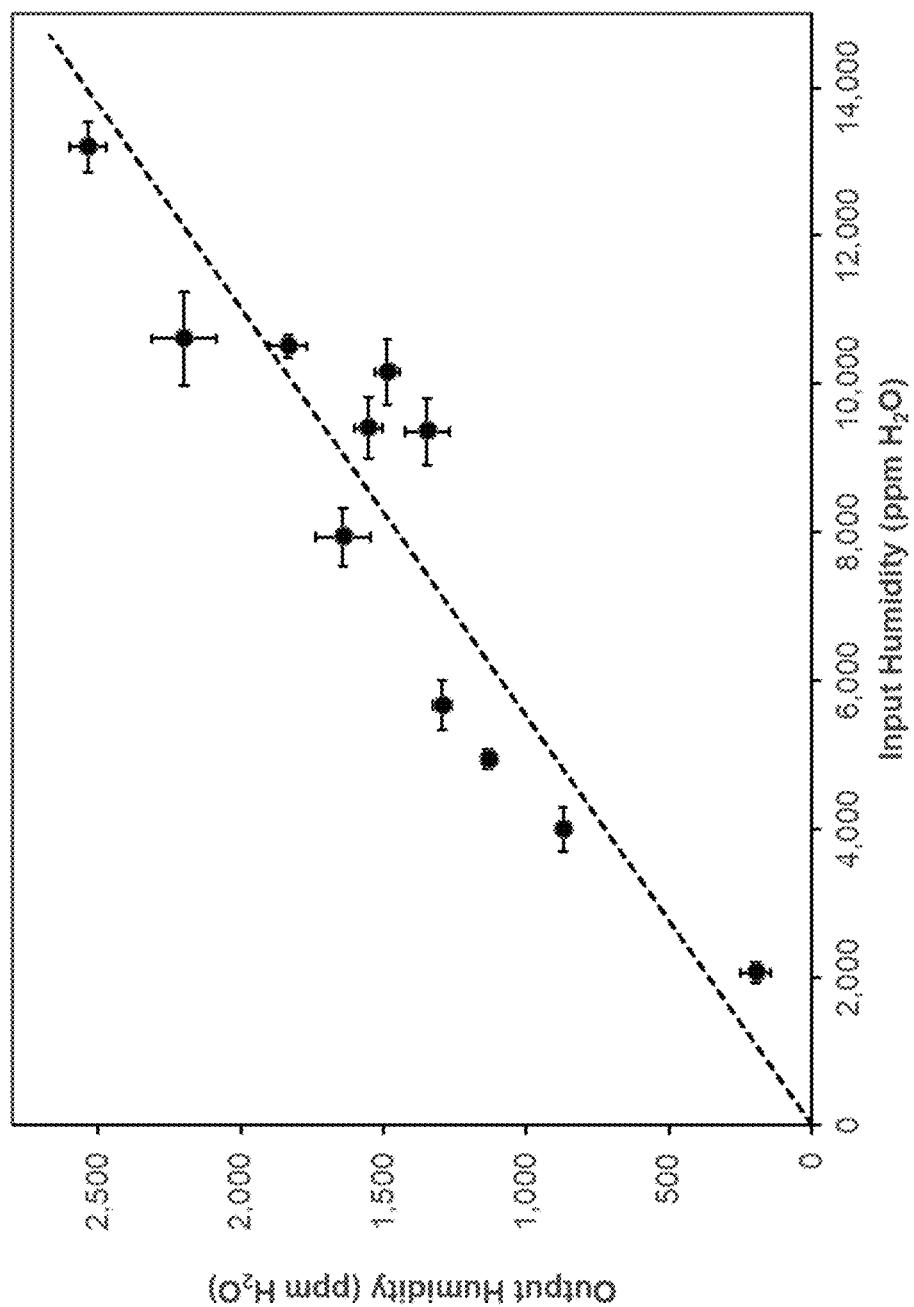
FIG. 13 shows data obtained from a reverse dry air swing prototype loaded with silica gel adsorbent and utilizing air with variable inlet humidity at a flow rate of 4 cfm.

To evaluate how the desiccant would perform in different humidity conditions, cycles were performed as in Example 2 except that the input humidity was varied during the adsorption step. FIG. 13 shows the results of these experiments. In all cases, the desiccant removed over 75% of the input humidity.

Example 4

Reverse Dry Air Swing Regeneration—Dependence on Flow Rate

Figure 14:
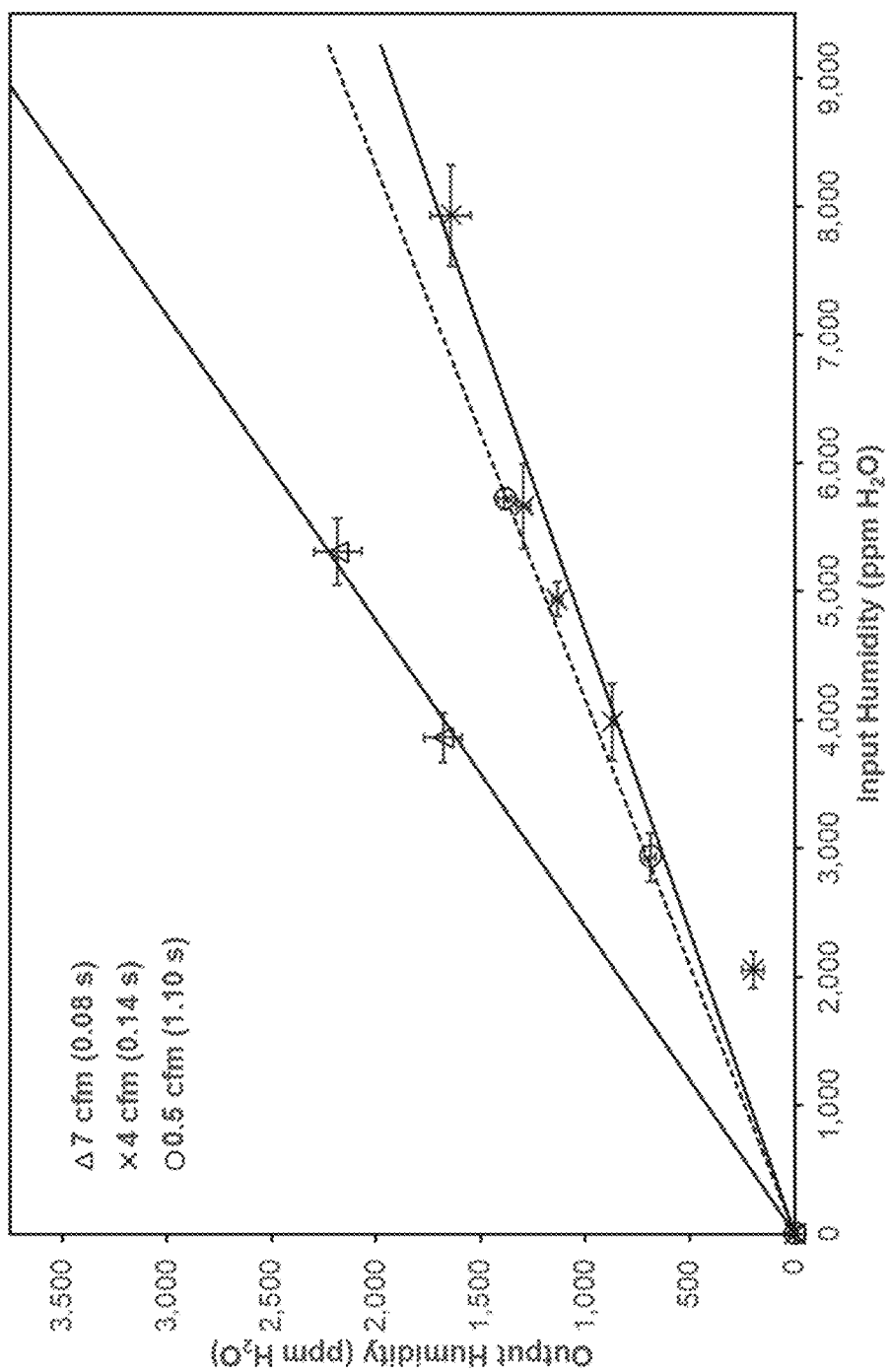
FIG. 14 shows data obtained from a reverse dry air swing prototype loaded with silica gel adsorbent and utilizing air with variable inlet humidity and variable inlet velocity, where the corresponding residence time is indicated next to the flow rate in parentheses.

To evaluate how the desiccant would perform in different humidity conditions, cycles were performed as in Example 2 except that both the input humidity and the air flow rate were varied during the adsorption step. For a given bed configuration, the air flow rate determines the residence time that the air is exposed to the adsorbent in the bed. FIG. 14 shows the results of these experiments. In all cases, the desiccant removed a significant amount of the input humidity, although the performance starts to diminish at very high flow rates (i.e., short residence times) as would be expected.

Example 5

Reverse Dry Air Swing Regeneration—Sigma 13X Desiccant (2.3 mm Bead)

Figure 15B:
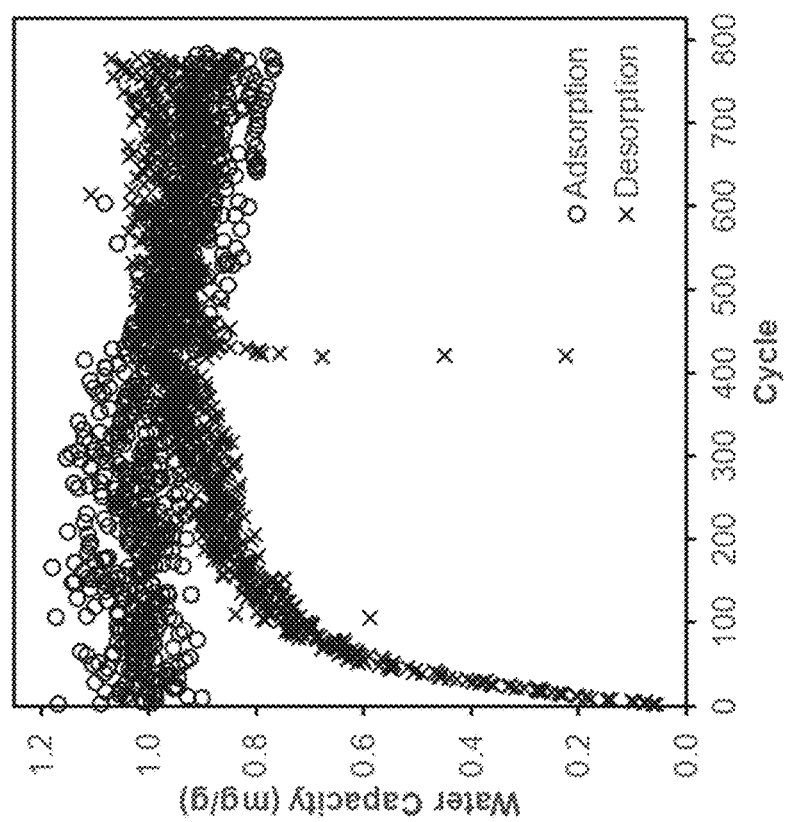
FIG. 15B shows water capacity as a function of cycle data obtained from a reverse dry air swing prototype loaded with Sigma 13X (2.8 mm diameter beads, 2.9-inch bed diameter, 2.4-inch bed height) and cycled at ambient temperature (24° C.) with an input humidity of approximately 2,000 ppm, flow rate of 4 cfm, and 2-minute cycle time.
Figure 15A:
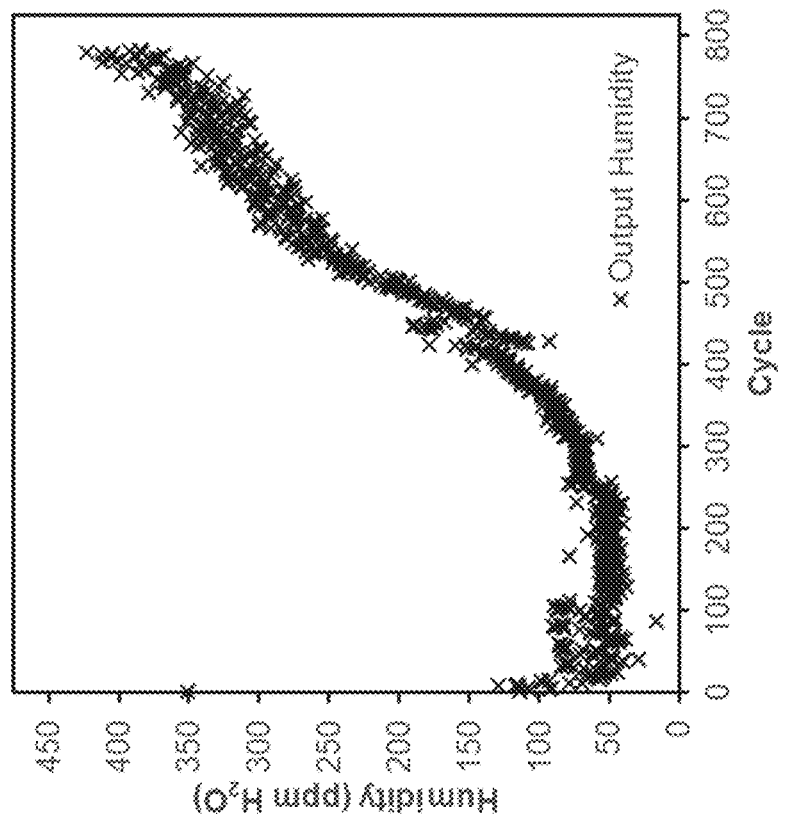
FIG. 15A shows outlet humidity as a function of cycle obtained from a reverse dry air swing prototype loaded with Sigma 13X (2.8 mm diameter beads, 2.9-inch bed diameter, 2.4-inch bed height) and cycled at ambient temperature (24° C.) with an input humidity of approximately 2,000 ppm, flow rate of 4 cfm, and 2-minute cycle time.

Compared with silica gel, Zeolite 13X has a much stronger affinity for water but is also more difficult to regenerate. To evaluate how this desiccant would perform, cycles were performed as in Example 1 except that air at approximately 2,000 ppm humidity was flowed through the reactor at 4 cfm at ambient temperature (approximately 24° C.) during the adsorption step. FIG. 15 shows the results of these experiments. Under these conditions, the output humidity continues to increase even after 700 cycles, and the absorption and desorption capacity do not converge but rather diverge from each other with continued cycle time. For reference, silica gel has an equilibrium output humidity of approximately 200 ppm under the same experimental conditions. Under ambient conditions, therefore, the strongly adsorbing 13X did not fully desorb enough water per cycle to allow it to reach a steady-state equilibrium. However, a high-affinity adsorbent such as 13X could be more suitable, for example, in cases where a higher operating temperature would allow sufficient desorption to occur to allow the system to reach steady-state equilibrium.

Example 6

Reverse Dry Air Swing Regeneration—3A Molecular Sieve Desiccant (8-12 Mesh)

Figure 16A:
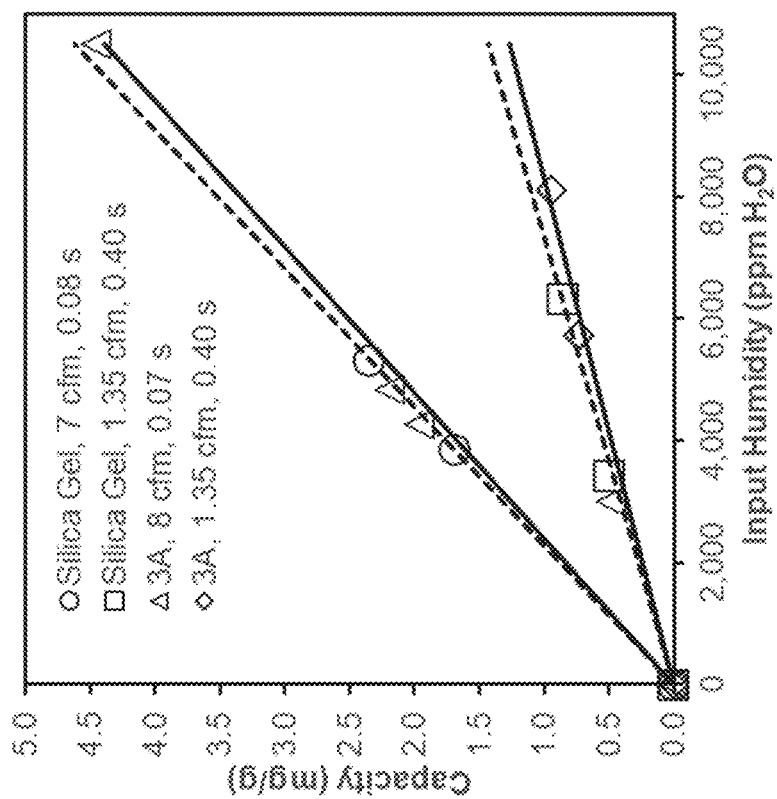
FIG. 16A shows a comparison of the performance of a molecular sieve 3A (mesh 8-12) vs the performance of 1.8 mm diameter packed bed silica gel with a plot of input humidity vs. output humidity, where the solid regression lines correspond to the 3A data and the dashed regression lines correspond to the silica data.
Figure 16B:
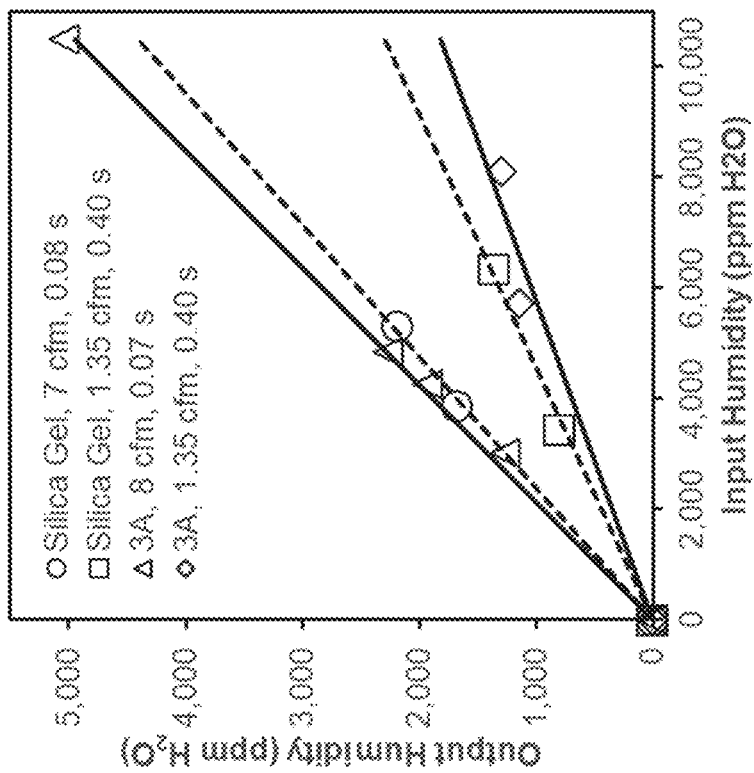
FIG. 16B shows a comparison of the performance of a molecular sieve 3A (mesh 8-12) vs the performance of 1.8 mm diameter packed bed silica gel with a plot of input humidity vs capacity, where the solid regression lines correspond to the 3A data and the dashed regression lines correspond to the silica data.

Compared with Zeolite 13X, 3A molecular sieves have a higher selectivity but less affinity for water. To evaluate how this desiccant would perform, cycles were performed as in Example 4. 3A molecular sieve (8-12 mesh) was loaded into the 2.9-inch reactor chamber at a depth of 2.45 inches (a loading of 207 g which equals the weight loading of silica gel used in Example 4). The data is summarized in FIGS. 16A-16B and show that the 3A molecular sieves perform similarly to silica gel at similar residence times.

Example 7

Reverse Dry Air Swing Regeneration—Structured Silica Gel Desiccant

Figure 17:
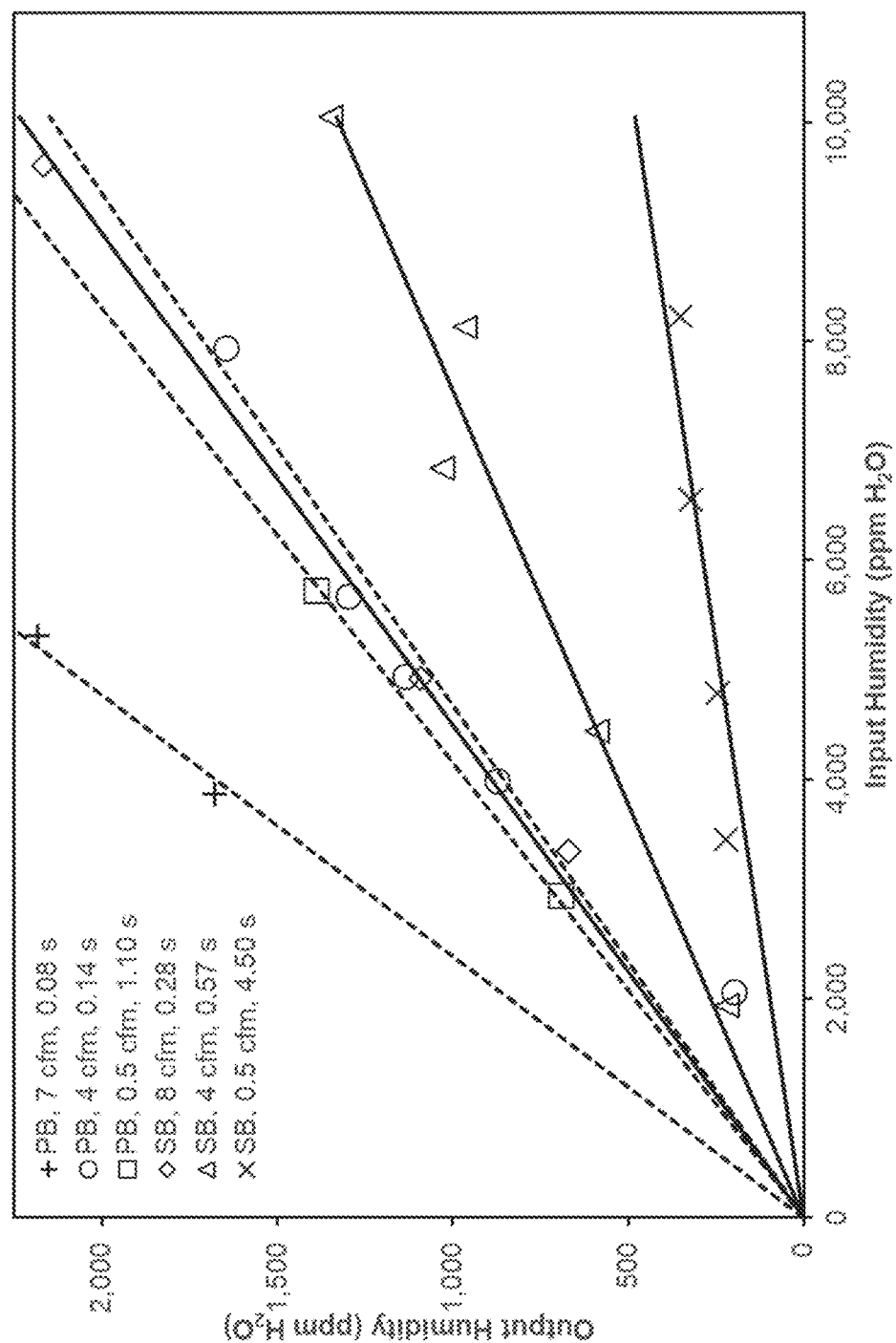
FIG. 17 shows a comparison of the performance (input humidity vs. output humidity) of a structured silica gel bed (SB) vs the performance of 1.8 mm diameter packed bed (PB) silica gel with a plot of input humidity vs. output humidity, where the solid regression lines correspond to the structured bed data and the dashed regression lines correspond to the packed bed data.
Figure 18:
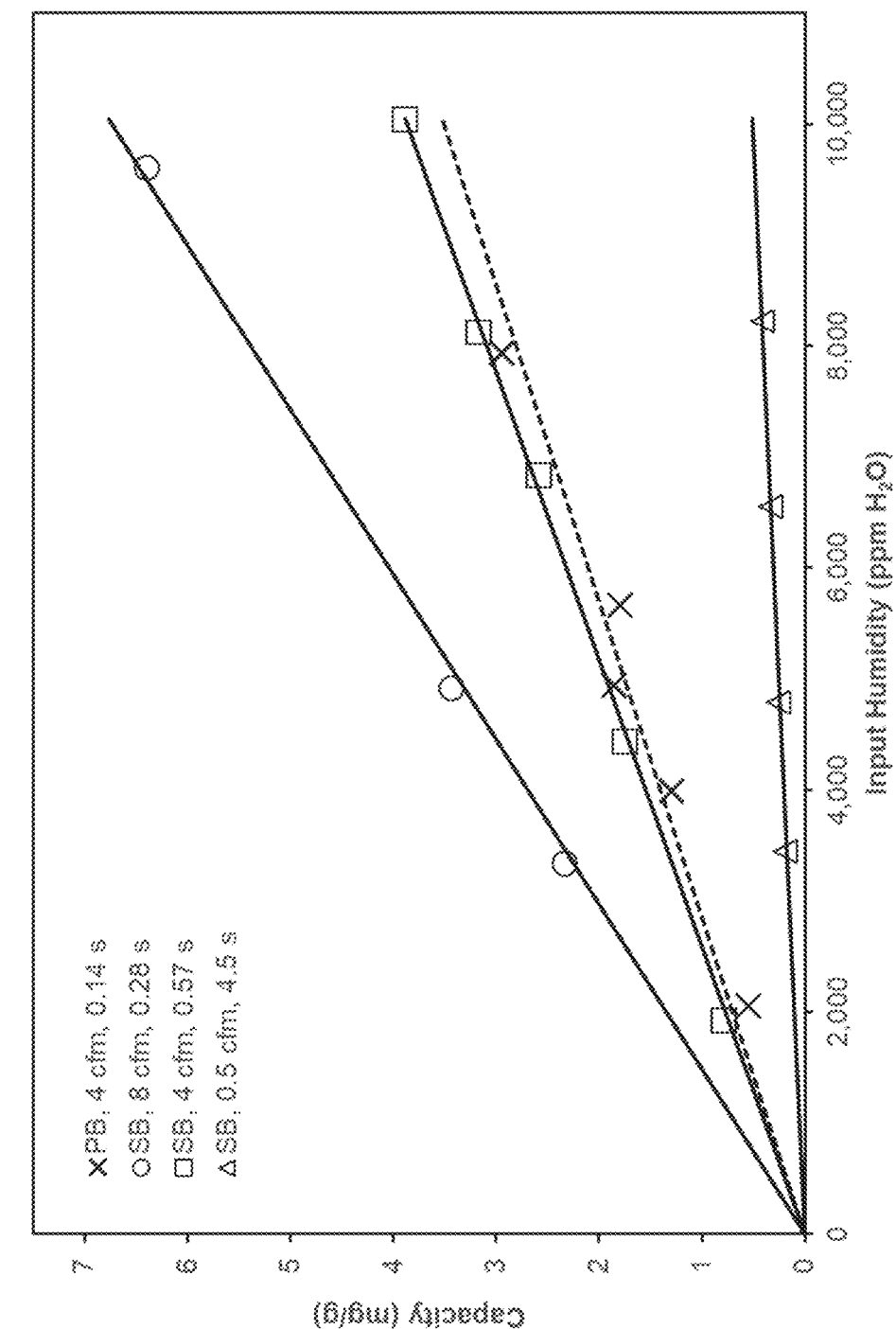
FIG. 18 shows a comparison of the performance (absorption capacity) of a structured silica gel bed (SB) vs the performance of 1.8 mm diameter packed bed (PB) silica gel, where the solid regression lines correspond to the structured bed data and the dashed regression lines correspond to the packed bed data.

Structured adsorbents can be desirable because they offer lower pressure drops for a given gas flow rate. The sorbent studied was 80 wt % silica gel with 170 pores/in$^2$, a pore diameter of 1.8 mm, 0.075 inches/pore in lateral direction, and 0.0783 inches/pore in longitudinal direction. The sorbent height was set to 9.9 inches in a 2.9-inch diameter bed such that the weight (207 g) of silica gel would equal that of the packed bed sorbents used in other tests. To evaluate how this desiccant would perform, cycles were performed as in Example 4. The data are summarized in FIG. 17 (output humidity vs. input humidity) and in FIG. 18 (adsorption capacity) and demonstrate excellent performance of the structured desiccant bed (SB) compared with the packed bed (PB), even at fairly high flow rates.

Computer System Overview

Example embodiments of the invention feature systems and methods for reducing energy requirements of using zeolites for carbon capture under humid conditions. FIG. 20 shows an exemplary system diagram of a computer-based direct air capture system 2000. System 2000 includes client devices (e.g., user computer 2010), direct air capture server 2005, direct air capture system 100, system interface 2015, and communications network 2099. While FIG. 20 illustrates an exemplary number of client computers and servers, system 2000 may also include additional elements. Clients and servers are only example roles of certain data processing systems and computer systems connected to communications network 199, which do not exclude other configurations or roles for these data processing systems.

Client devices 2010 can be configured to communicate with one or more devices within the system 2000 via communications network 2099. Client devices 2010 can take the form of a smartphone, a tablet computer, a laptop computer, a desktop computer, a wearable computing device, or any other suitable computing device. Software application programs 2021 described as executing in the system 2000 may be configured to execute in client devices 2010 in a similar manner. Data and information stored or produced in another data processing system can be configured to be stored or produced in a similar manner. In an exemplary embodiment, a request to perform the direct air capture processes in accordance with the invention originate at a client device 2010.

Direct air capture server (DAC) 2005 can be configured to execute computer-readable instructions to perform the operations and processes described above. For example, based on sampled outputs of the ambient air, exhaust air, and intermediate streams, the DAC server 2005 can determine whether an operation or activity or step in the above processes needs to be modified and can initiate operations to make those modifications.

The DAC server 2005 may be a stand-alone device or may be incorporated within another device included in system 2000, such as the system interface 2015, for example. The DAC server 2005 can run computer applications, including adsorption application 2061, desorption application 2063, and reports and analytics application 2068. These applications, and others, can have their own corresponding databases 2062, 2064, 2069 with which to store application software instructions, system and performance data, and other files, programs, and applications necessary to carry out the methods described in this disclosure.

System interface 2015 operationally connects the DAC systems in accordance with the invention to the computer systems used to carry out the methods and processes in accordance with the invention. System interface 2015 includes DAC applications 2021 that run in tandem with their corresponding applications 2061, 2063, 2068 on DAC server 2005.

Communications network 2099 is the medium used to provide communication links between several devices and computers connected together within the system 2000. Communications network 2099 can include connections, such as wired communication links, wireless communication links, or fiber optic cables, from individual clients, servers, databases, sources of data, and processing components. The clients, servers, data, and processing components can access the communication network 2099 using a variety of software architectural frameworks, web services, file transfer protocols, and Internet exchange points. Communications network 2099 can represent a collection of networks and gateways that use the Transmission Control Protocol/Internet Protocol (TCP/IP) and other communication protocols, as well as application programming interfaces (APIs), to communicate with one another and with devices connected to the network 2099. One example of the communications network 2099 includes the Internet, which can include data communication links between major nodes and/or host computers, including thousands of commercial, governmental, educational, and other computer systems that route data and messages. FIG. 20 is one example of an environment of an exemplary embodiment of the invention and is not an architectural limitation for different illustrative embodiments of the invention.

The user devices 2010, the DAC server 2005, the components of the DAC system 100, and the databases 2062, 2064, 2066 can connect to the communications network 2099 through various communication interfaces included in the respective computing devices. The user devices 2010, the DAC server 2005, the system interface 2015, and the databases 2062, 2064, 2066 can include servers, databases, processors, and/or any of the necessary software and hardware to execute applications and methods for direct air capture of carbon dioxide, and metadata as well as other files and data to execute applications and methods of the invention.

Software applications to initiate and carry out the direct air capture processes can execute on any computer in the system 2000. The user devices 2010, the DAC server 2005, the system interface 2015, and the databases 2062, 2064, 2066 can include data and can have software applications and/or software tools executing on them.

FIG. 20 displays an example of a system architecture and shows certain components in an exemplary embodiment of the invention. For example, the user devices 2010, the DAC server 2005, the system interface 2015, and the databases 2062, 2064, 2066 are depicted as servers and clients only as examples and not to imply a limitation to a client-server architecture. In another exemplary embodiment of the invention, the system 2000 can be distributed across several data processing (computer) systems and a data network as shown. Similarly, in another exemplary embodiment of the invention, the system 2000 can be implemented on a single data processing system within the scope of the illustrative embodiments. User devices 2010, the DAC server 2005, the system interface 2015, and the databases 2062, 2064, 2066 can also represent example nodes in a cluster, partitions, and other configurations suitable for implementing an exemplary embodiment of the invention. User devices 2010, the DAC server 2005, the system interface 2015, and the databases 2062, 2064, 2066 can be servers, personal computers, and/or network computers.

As will be appreciated by one skilled in the art, aspects of the disclosure may be embodied as systems, methods, and/or computer program products. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store, a computer program/app for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, or any suitable combination. Computer program code for carrying out operations for aspects of the disclosure may be written in any combination of one or more programming languages, including an object-oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of communications network, including a local area network (LAN) or a wide area network (WAN), or the connection may be made to an external computer (for example, through the Internet using an Internet Service Provider).

Aspects of the invention are described in this disclosure with reference to flowchart illustrations and/or block diagrams of methods, apparatus (systems) and computer program products according to exemplary embodiments of the invention. Each block of the flowchart illustrations and/or block diagrams, and combinations of blocks in the flowchart illustrations and/or block diagrams, can be implemented by computer program instructions. These computer program instructions may be provided to a processor of a server, or other programmable data processing apparatus to produce a machine, such that the instructions, which execute via the processor of the server or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams, as shown in this disclosure, illustrate the architecture, functionality, and operation of implementations of systems, methods, and computer program products according to various exemplary embodiments of the invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Example Computing Devices

Figure 21:
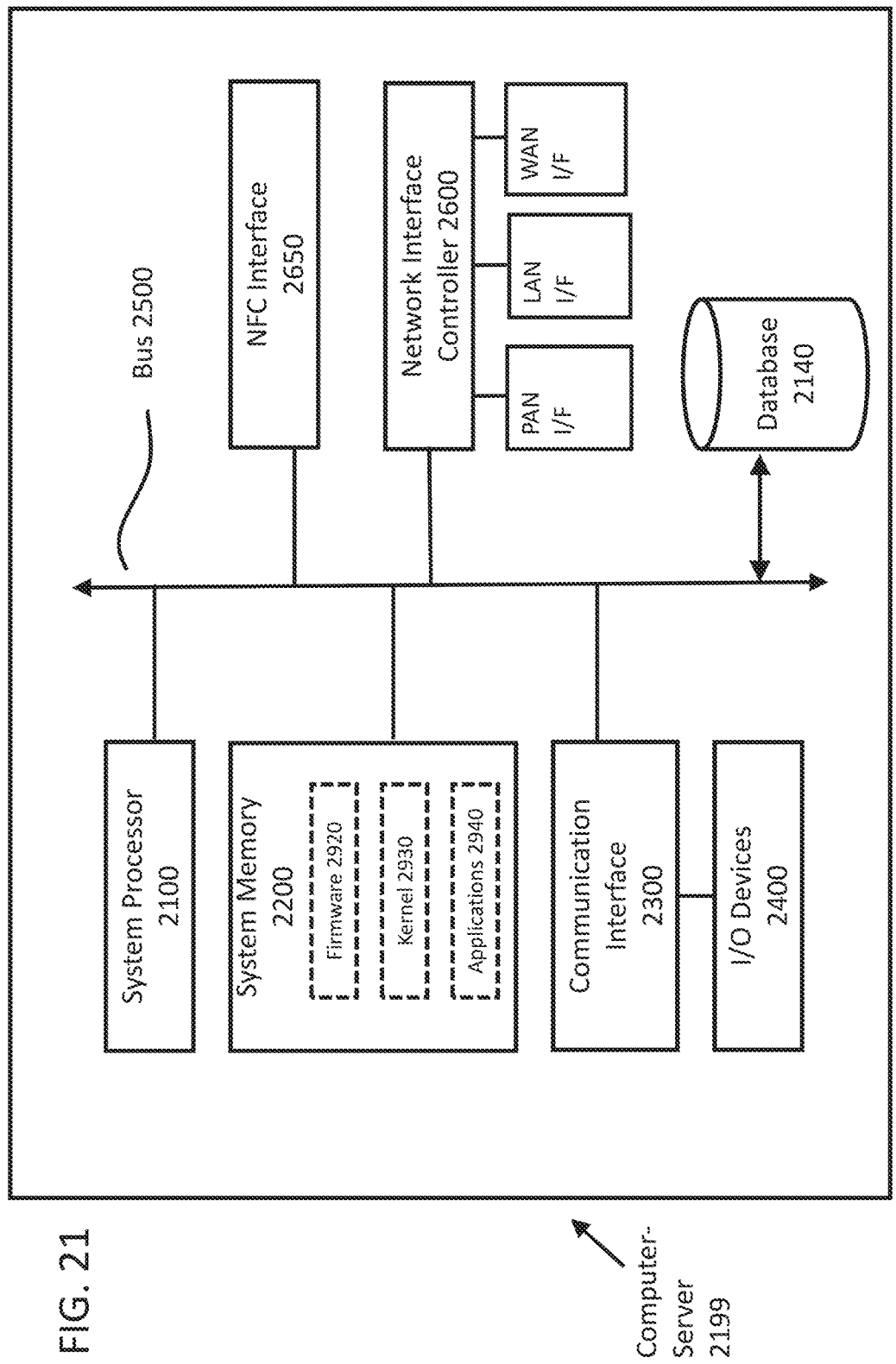
FIG. 21 shows an example computing device of a computer-based direct air capture system in accordance with the invention.

As shown in FIG. 21, the direct air capture computing devices of the invention, including the user devices 2010, the DAC server 2005, the system interface 2015, and the databases 2062, 2064, 2066 are shown as an example computing device 2199 according to the invention.

Computing device 2199 is an example computing device that includes at least one processor 2100, memory 2200, a communication interface 2300, and input/output (I/O) device(s) 2400. The various elements of computing device 2199 may be coupled via bus 2500 or any other type of link that electrically connects the elements within the computing device 2199. Computing device 2199 may include other components or elements in other configurations, and may include servers and client computers. In this example, the computing device 2199 is implemented as a standalone device, although the computing device 2199 may be integrated into another elements or in other configurations such as blade devices in a chassis-blade implementation, for example. The identified components are so identified merely for exemplary purposes, and it is understood that many variations of specific hardware and software used to implement the computing device 2199 are possible, as well be appreciated by those skilled in the relevant art(s).

Client user devices 2010, the DAC server 2005, the system interface 2015, and the databases 2062, 2064, 2066, may be exemplary embodiments of computing device 2199. Computing device 2199 can be a standalone device or may be integrated into another device.

Processor 2100 can be configured to interpret an electrical signal provided to the processor 2100, perform one or more operations based on the electrical signal or another trigger, or transmit an electrical signal to control an operation of computing device 2199. Processor 2100 may include one or more microprocessors configured to execute computer/machine readable and executable instructions stored in memory 2200 to implement various operations set forth in the instructions to control computing device 2199. For example, when executed by at least one processor 2100, the instructions stored in memory 2200 may cause processor 2100 to perform operations that retrieve data from memory 2200 or some other data stream (e.g., from communication interface 2300, I/O device(s) 2400, etc.), transmit data to one or more elements of computing device 2199 (e.g., another processor, memory 2200, communication interface 2300, I/O device(s) 2400), or perform one or more operations (e.g., processing, decisions, arithmetic, logic, etc.). Some operations may consider static or dynamic variables.

The processor 2100 may be configured to execute computer/machine readable and executable instructions stored in memory 2200 to implement one or more portions of the processes described above in connection with FIGS. 1-20. Processor 2100 can include any number of processors and can be any type of processor, processing unit, or controller that performs operations on data. For example, processor 2100 may include digital signal processors, micro-controllers, switch chips, bus controllers, application specific integrated circuits (ASICs), programmable logic devices (PLDs), field programmable logic devices (FPLDs), field programmable gate arrays (FPGAs), and the like, programmed or configured according to the teachings as described and illustrated with respect to FIGS. 1-20.

Memory 2200 may be a device or system used to store information in computing device 2199. Memory 2200 may include computer readable media, namely computer readable or processor readable storage media, which are examples of machine-readable storage media. Computer readable storage/machine-readable storage media can include volatile, nonvolatile, removable, or non-removable media implemented in any method or technology for storage of information, such as computer readable/machine-executable instructions, data structures, program modules, or other data, which can be obtained and/or executed by one or more processors, such as processor 2100, to perform actions, including implementing an operating system for controlling the general operation of computing device 2199 in accordance with the processes described above in connection with FIGS. 1-20, for example.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

When the instructions stored in system memory 2200 are run by the system processor 2100, the direct air capture computing device 2199 implements at least a portion of the processes described further below to perform direct air capture processes in connection with FIGS. 1-20, in addition to various other computer functions, including redundancy functions, version controls, server load balancing functions, device configuration functions (e.g., defining network security policies), virtual private network (VPN) hosting, network traffic management, loss control, and other functions.

Communication interface 2300 may be configured to transmit or receive information from other devices. Communication interface 2300 may be a wired or wireless interface capable of communicating a signal using one or more communication protocols within a communication network or system. Wireless interfaces may include a long range or short rage communication interface. Examples of the communication protocols include, but are not limited to, transmission control protocol/internet protocol (TCP/IP), any of the 3rd Generation Partnership Project (3GPP) protocols, IEEE (wireless fidelity (Wi-Fi™, Near-field communication (NFC), Bluetooth™, etc.). Communication interface 2300 may include one or more antennas or one or more physical ports as well as any coding or modulating elements for transmissions and decoding or demodulating elements for reception. Communication interface 2300 may include any number or any combination of various interfaces.

Communication interface(s) 2300 can include one or more user input and output device interface mechanisms, such as a computer keyboard, mouse, display device, and the corresponding physical ports and underlying supporting hardware and software to enable the direct air capture computing devices 2199 to communicate with the outside environment for accepting user data input and providing user output, although other types and numbers of user input and output devices can be used. Alternatively or in addition, as will be described in connection with network interface controller 2600 below, the direct air capture computing devices 2199 can communicate with the outside environment for certain types of operations (e.g., configuration), for example via a network management port.

Network interface controller 2600 provides physical access to a networking medium and provides a low-level addressing system, which enables the direct air capture computing devices 2199 to engage in TCP/IP communications over networked systems (such as those shown in FIGS. 1-20), to the direct air captures steps in the methods of the invention, and to maintain application services, although the network interface controller 2600 can be constructed for use with other communication protocols and types of networks, and can include other components, and can perform other functions. Network interface controller 2600 is sometimes referred to as a transceiver, a transceiving device, or a network interface card (NIC), which transmits and receives network data packets to one or more networks, such as system 2000 in this example. When the direct air capture computing device 2199 includes more than one system processor 2100 (or a processor 2100 has more than one core), each processor 2100 (and/or core) can use the same single network interface controller 2600 or a plurality of network interface controllers 2600. Further, the network interface controller 2600 can include one or more physical ports, such as Ethernet ports, to couple the direct air capture devices 2199 with other network devices, such as servers and other sites. Additionally, the network interface controller 2600 can include certain physical ports dedicated to receiving and/or transmitting certain types of network data, such as device management related data for configuring the direct air capture computing devices 2199.

The client user devices 2010, the DAC server 2005, the system interface 2015, and the databases 2062, 2064, 2066 can communicate using a number of communication protocols, including without limitation: Secure Sockets Layer (SSL), Data Distribution Service (DDS), Transport Layer Security (TLS), near field communication (NFC), and Bluetooth transmission protocols.

In one example, the network interface controller 2600 is an FPGA that can include a local memory and be configured with logic to implement one or more aspects of the technology, including by way of example only, the direct air capture processes described in this disclosure, although the network interface controller 2600 can include other types of configurable hardware, such as digital signal processors, micro-controllers, ASICs, PLDs, FPLDs, and the like, programmed or configured according to the teachings as described and illustrated herein with respect to FIGS. 1-20, as well as software executed by the system processor 2100, combinations thereof, and other components and elements configured in other manners which could implement one or more aspects of the technology. The use of specialized hardware in this example allows the network interface controller 2600 to rapidly process network data packets.

Some example embodiments of the computing device 2199 also can include a near field communication (NFC) interface 2650. The NFC interface 2650 can allow for extremely close-range communication at relatively low data rates (e.g., 424 kb/s), and can comply with such standards as ISO/IEC 18092, ECMA-340, ISO/IEC 21481, ECMA-352, ISO 14443, and/or ISO 15693. The NFC interface 2650 can have a range of approximately 2-4 cm. The close-range communication with the NFC interface 2650 can take place via magnetic field induction, allowing the NFC interface 2650 to communicate with other NFC interfaces 2650 or to retrieve information from tags having radio frequency identification (RFID) circuitry and with other NFC-equipped computing devices 2199. The NFC interface 2650 can enable initiation and/or facilitation of data transfer of documents, and other data from one computing device 2199 to another computing device, including the methods described in this disclosure and accompanying figures.

I/O device(s) 2400 can include one or more user input and output device interface mechanisms, such as a computer keyboard, mouse, display device, and the corresponding physical ports and underlying supporting hardware and software to enable direct air capture computing device 2199 to communicate with the outside environment for accepting user data input and providing user output, although other types and numbers of user input and output devices can be used.

I/O device(s) 2400 may be a peripheral device configured to create an input signal or receive an output signal. An input device may receive an input and in response transmit a signal to processor 2100 indicating that the input has been received. An output device may receive information from processor 2100 to be output from the computing device 2199. Examples of an input device may include, but are not limited to, a touch screen, a keyboard, a mouse, a button, a camera, and a microphone. Examples of an output device may include, but are not limited to, a speaker and a display. Any number and/or combination of I/O devices(s) 2400 may be included in computing device 2199.

Bus 2500 is configured to communicate data between components of the computing device 200. Bus 250 may be any type of connector that allows for communication between components including, but not limited to, a wire, an optical fiber, etc. Bus 2500 may include a communication bus, link, bridge and supporting components, such as bus controllers and/or arbiters. By way of example only, bus 2500 may include HyperTransport, peripheral component interconnect (PCI), PCI Express, InfiniBand, Universal Serial Bus (USB), Firewire, Serial Advanced Technology Attachment (SATA), Small Computer System Interface (SCSI), Integrated Drive Electronics (IDE) and Accelerated Graphics Port (AGP) buses, although other types and numbers of buses can be used.

While each of the computers 2199 can include the processor 2100, memory 2200, communication interface 2300, and network interface controller 2600 coupled together by a bus 2500, two or more computing systems or devices can be substituted for any one of the devices in the system 2000. Accordingly, principles and advantages of distributed processing, such as redundancy, replication, and the like, also can be implemented as desired to increase the robustness and performance of the devices and systems of the system 2000. The system 2000 also can be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, Wi-Fi, local area networks, intranets, and combinations of networks, for example. Peer-to-peer (p2p) networks can be used.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

As those skilled in the art will appreciate, numerous modifications and variations of the present invention are possible in light of these teachings, and all such are contemplated hereby. All of the references cited herein are incorporated by reference herein for all purposes, or at least for their teachings in the context presented.

We claim:

1. A direct air capture (DAC) method for separating carbon dioxide ($CO_2$) from ambient air while regenerating a desiccant reactor, the method comprising:
adsorption and desorption of carbon dioxide ($CO_2$) and water,
wherein the adsorption includes:
drawing a first ambient air stream (101) into a direct air capture plant along a first flow path (F1);
receiving the first drawn-in ambient air stream (102) in a portion of a first desiccant reactor (119);
removing humidity from the first drawn-in ambient air stream (102) with the first desiccant reactor (119) to create a first relatively dry inlet gas stream (103);
receiving the first relatively dry inlet gas stream (103) in a first solid sorbent bed (121),
adsorbing remaining humidity and carbon dioxide ($CO_2$) with the first solid sorbent bed (121) to create a first dry outlet gas stream (104);
passing the first dry outlet gas stream (104) through a second desiccant reactor (169);
removing water from the second desiccant reactor (169) as the first dry outlet gas stream (104) reacts with a desiccant in the second desiccant reactor (169); and
re-adsorbing the removed water into ambient air (140); and
wherein the desorption includes:
applying a vacuum to a third solid sorbent bed and a fourth solid sorbent bed to remove air from the third solid sorbent bed and from the fourth solid sorbent bed and to remove nitrogen from a solid sorbent in the third solid sorbent bed and in the fourth solid sorbent bed; and
heating the solid sorbent in the third solid sorbent bed and in the fourth solid sorbent bed to desorb carbon dioxide ($CO_2$) and water.

2. A method of claim 1 further comprising:
drawing a second ambient air stream (151) into the direct air capture plant along a second flow path (F2), wherein the second flow path (F2) is in a direction opposite to the first flow path (F1);
receiving the second drawn-in ambient air stream (151) in a portion of the second desiccant reactor (169) to create a second relatively dry inlet gas stream (153);
receiving the second relatively dry inlet gas stream (153) in a second solid sorbent bed (171);
adsorbing remaining humidity and carbon dioxide ($CO_2$) in the second solid sorbent bed (171) to create a second dry outlet gas stream (154); and
regenerating the first desiccant reactor (119) including:
receiving the second dry outlet gas stream (154) in a portion of the first desiccant reactor (119);
removing water from the first desiccant reactor (119) as the second dry outlet gas stream (154) reacts with a desiccant in the first desiccant reactor (119); and
re-adsorbing the removed water into ambient air (130).

3. A method of claim 1, wherein at least one of the solid sorbent beds is a zeolite bed.

4. A method of claim 2, further comprising:
filtering at least one of the group of the first ambient air stream (101) and the second ambient air stream (151).

5. A method of claim 2, further comprising:
separating the first ambient air stream (101) from the second dry outlet gas stream (154) with an air sealing separator positioned between the first flow path (F1) and the second flow path (F2).

6. A method of claim 2, further comprising:
ejecting at least one of the group of the re-adsorbed water from the second desiccant reactor and the re-adsorbed water from the first desiccant reactor into ambient air.

7. A method of claim 1, further comprising:
transferring thermal energy generated from the adsorption of water in the first desiccant reactor (119) to the dry stream (104) exiting the first solid sorbent bed (121).

8. A method of claim 1, wherein at least one of the group of the first desiccant reactor and the second desiccant reactor are desiccant wheels.

9. A method of claim 8, wherein the desiccant wheels rotate between the first ambient air stream (101) and the second ambient air stream (151), such that a portion of each desiccant wheel is continuously adsorbing moisture from the respective incoming ambient stream while the remaining portion of each desiccant wheel is being regenerated by reverse dry flow of the outlet air stream.

10. A method of claim 8, wherein the at least one of the group of the first desiccant reactor and the second desiccant reactor includes an integrated filter, and the method further comprises filtering at least one of the group of the first ambient air stream (101) and the second ambient air stream (151) with the integrated filter.

11. A direct air capture (DAC) method for separating carbon dioxide ($CO_2$) from ambient air while regenerating desiccant reactors, the method comprising:
  separating carbon dioxide ($CO_2$) from ambient air including:
    drawing a first ambient air stream (801) into a direct air capture plant along a first flow path (F1),
    receiving the first drawn-in humid inlet gas stream (801) in a portion of a first desiccant reactor (883) to create a first relatively dry inlet gas stream (802),
    receiving the first relatively dry inlet gas stream (802) in a solid sorbent bed (887), and
    adsorbing remaining humidity and carbon dioxide ($CO_2$) in the solid sorbent bed (887) to create a first dry outlet gas stream (803);
  regenerating a second desiccant reactor (891) including:
    receiving the first dry outlet gas stream (803) in a portion of the second desiccant reactor (891),
    removing water from the second desiccant reactor (891) as the first dry outlet gas stream (803) reacts with a desiccant in the second desiccant reactor (891), and
    re-adsorbing the removed water into ambient air (804);
  drawing a second ambient air stream (811) into the direct air capture plant along a second flow path (F2), wherein the second flow path F2) is in a direction opposite to the first flow path (F1);
  receiving the second drawn-in ambient air stream (811) in a portion of the second desiccant reactor (891) to create a second relatively dry inlet gas stream (812);
  receiving the second relatively dry inlet gas stream (812) in a second solid sorbent bed (889);
  adsorbing remaining humidity and carbon dioxide ($CO_2$) in the second solid sorbent bed (889) to create a second dry outlet gas stream (813); and
  regenerating the first desiccant reactor (883) including:
    receiving the second dry outlet gas stream (813) in a portion of the first desiccant reactor (883),
    removing water from the first desiccant reactor (883) as the second dry outlet gas stream (813) reacts with a desiccant in the first desiccant reactor (883), and
    re-adsorbing the removed water into ambient air (830),
  wherein the first flow path (F1) and the second flow path (F2) are continuous adsorption streams that enter the direct air capture plant from opposite directions.

12. The method for separating carbon dioxide ($CO_2$) from ambient air while regenerating the desiccant reactors of claim 11, wherein at least one of the solid sorbent beds is a zeolite bed.

13. The method for separating carbon dioxide ($CO_2$) from ambient air while regenerating the desiccant reactors of claim 11, further comprising:
  filtering at least one of the group of the first ambient air stream (801) and the second ambient air stream (811).

14. The method for separating carbon dioxide ($CO_2$) from ambient air while regenerating the desiccant reactors of claim 11, further comprising:
  separating the first ambient air stream (801) from the second dry outlet gas stream (813) with an air sealing separator positioned between the first flow path and the second flow path.

15. The method for separating carbon dioxide ($CO_2$) from ambient air while regenerating the desiccant reactors of claim 11, further comprising:
  transferring thermal energy generated from the adsorption of water in desiccant reactor (883) to the dry stream (803) exiting the solid sorbent bed (887).

16. The method for separating carbon dioxide ($CO_2$) from ambient air while regenerating the desiccant reactors of claim 10, wherein the first desiccant reactor (883) and the second desiccant reactor (891) are desiccant wheels.

17. The method for separating carbon dioxide ($CO_2$) from ambient air while regenerating the desiccant reactors of claim 16, wherein the desiccant wheels (883, 891) rotate between the first ambient air stream (801) and the second ambient air stream (811), such that a portion of each desiccant wheel (883, 891) is continuously adsorbing moisture from the respective incoming ambient stream (801, 811) while the remaining portion of each desiccant wheel (883, 891) is being regenerated by reverse dry flow of the outlet air streams.

18. The method of claim 16, wherein each of the desiccant wheel of the first reactor and the desiccant wheel of the second reactor includes an integrated filter, and the method further comprises filtering at least one of the group of the first ambient air stream (101) and the second ambient air stream (151) with the integrated filter.

19. The method of claim 11,
  wherein the solid sorbent bed (887) includes two reactors,
  wherein the second solid sorbent bed (889) includes two reactors,
  wherein the two reactors included in the solid sorbent bed (887) are configured such that a first reactor of the solid sorbent bed (887) is regenerated while a second reactor of the solid sorbent bed (887) continues to adsorb, and
  wherein the two reactors included in the second solid sorbent bed (889) are configured such that a first reactor of the second solid sorbent bed (889) is regenerated while a second reactor of the second solid sorbent bed (889) continues to adsorb.

* * * * *